US012795731B2

(12) United States Patent
Yoshimura et al.

(10) Patent No.: US 12,795,731 B2
(45) Date of Patent: Nov. 10, 2026

(54) TERMINAL APPARATUS, BASE STATION APPARATUS, AND COMMUNICATION METHOD

(71) Applicant: SHARP KABUSHIKI KAISHA, Sakai City (JP)

(72) Inventors: Tomoki Yoshimura, Sakai City (JP); Shoichi Suzuki, Sakai City (JP); Toshizo Nogami, Sakai City (JP); Daiichiro Nakashima, Sakai City (JP); Wataru Ouchi, Sakai City (JP); Huifa Lin, Sakai City (JP); Takahisa Fukui, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 230 days.

(21) Appl. No.: 18/019,770

(22) PCT Filed: Aug. 3, 2021

(86) PCT No.: PCT/JP2021/028747
§ 371 (c)(1),
(2) Date: Feb. 3, 2023

(87) PCT Pub. No.: WO2022/030479
PCT Pub. Date: Feb. 10, 2022

(65) Prior Publication Data

US 2023/0300893 A1 Sep. 21, 2023

(30) Foreign Application Priority Data

Aug. 5, 2020 (JP) ................................ 2020-132956

(51) Int. Cl.
*H04W 74/0833* (2024.01)
*H04W 74/00* (2009.01)
*H04W 74/0836* (2024.01)

(52) U.S. Cl.
CPC ..... *H04W 74/0833* (2013.01); *H04W 74/002* (2013.01); *H04W 74/0836* (2024.01)

(58) Field of Classification Search
CPC ........... H04W 74/0833; H04W 74/002; H04W 74/0836; H04W 74/006; H04W 48/16;
(Continued)

(56) References Cited

U.S. PATENT DOCUMENTS 11,013,036 B2 * 5/2021 Li ..................... H04L 27/26132
11,310,723 B2 * 4/2022 Babaei .................. H04W 48/12
(Continued)

FOREIGN PATENT DOCUMENTS

WO 2020/066854 A1 4/2020

OTHER PUBLICATIONS

NTT Docomo, "New SID Proposal: Study on New Radio Access Technology", RP-160671, 3GPP TSG RAN Meeting #71, Göteborg, Sweden, Mar. 7-10, 2016.
(Continued)

*Primary Examiner* — Nizam U Ahmed
(74) *Attorney, Agent, or Firm* — ScienBiziP, P.C.

(57) ABSTRACT

An index of the contention-based random access preamble used in a first random access procedure for an n-th SS/PBCH block on a certain PRACH occasion is selected from among indexes $(n-1)*N_{total}/N$ to $(n-1)*N_{total}/N+R-1$, second RACH configuration information includes at least a second number $R_x$ of contention-based random access preambles allocated per SS/PBCH block on one PRACH occasion, and information indicative of a first value $S_x$, and an index of the contention-based random access preamble used in the second random access procedure for the n-th SS/PBCH block on the certain PRACH occasion is selected from among indexes $(n-1)*N_{total}/N+S_x$ to $(n-1)*N_{total}/N+S_x+R_x-1$.

4 Claims, 13 Drawing Sheets

(58) Field of Classification Search
CPC .. H04L 5/0053; H04L 5/0092; H04L 27/2602
See application file for complete search history.

(56) References Cited

U.S. PATENT DOCUMENTS

| | | | | |
|---|---|---|---|---|
| 2019/0223228 | A1* | 7/2019 | Ko | H04L 5/0048 |
| 2020/0100170 | A1 | 3/2020 | Babaei et al. | |
| 2020/0229242 | A1* | 7/2020 | Xiong | H04W 74/002 |
| 2021/0051708 | A1* | 2/2021 | Agiwal | H04W 56/001 |
| 2022/0183072 | A1* | 6/2022 | Kang | H04W 56/0015 |
| 2022/0201520 | A1* | 6/2022 | Zhou | H04W 72/23 |
| 2023/0422306 | A1* | 12/2023 | Dallal | H04W 16/26 |
| 2024/0405837 | A1* | 12/2024 | Ali | H04B 7/0695 |

OTHER PUBLICATIONS

Ran Chairman et al., “Release 17 package for RAN”, RP-193216, 3GPP TSG RAN Meeting #86, Sitges, Spain, Dec. 9-12, 2019.

3GPP TS 38.213 V16.1.0 (Mar. 2020) 3rd Generation Partnership Project; Technical Specification Group Radio Access Network; NR; Physical layer. Procedures for control (Release 16).

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2020-132956 filed on Aug. 5, 2020, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB) and a terminal apparatus is also referred to as User Equipment (UE). LTE is a cellular communication system in which multiple areas covered by base station apparatuses are deployed in a cell structure. A single base station apparatus may manage multiple serving cells.

3GPP has been studying a next generation standard (New Radio or NR) (NPL 1) to make a proposal for International Mobile Telecommunication (IMT)-2020, a standard for a next generation mobile communication system developed by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

3GPP has been studying enhancement of services supported by NR (NPL 2).

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.

NPL 2. "Release 17 package for RAN", RP-193216, RAN chairman, RAN1 chairman, RAN2 chairman, RAN3 chairman, 3GPP TSG RAN Meeting #86, Sitges, Spain, 9-12 Dec. 2019

SUMMARY OF INVENTION

Technical Problem

One aspect of the present invention provides a terminal apparatus that efficiently performs communication, a communication method used for the terminal apparatus, a base station apparatus that efficiently performs communication, and a communication method used for the base station apparatus.

Solution to Problem (1) According to some aspects of the present invention, the following measures are provided. Specifically, a first aspect of the present invention provides a terminal apparatus including a receiver configured to receive first RACH configuration information used in a first random access procedure and second RACH configuration information used in a second random access procedure, and a transmitter configured to select one random access preamble and to transmit the random access preamble on a PRACH, wherein the first RACH configuration information includes at least information indicative of a first number $N_{total}$ of random access preambles allocated on one PRACH occasion, information indicative of a first number N of SS/PBCH blocks allocated on the one PRACH occasion, and information indicative of a first number R of contention-based random access preambles allocated per SS/PBCH block on the one PRACH occasion, an index of the contention-based random access preamble used in the first random access procedure for an n-th SS/PBCH block on a certain PRACH occasion is selected from among indexes $(n-1)*N_{total}/N$ to $(n-1)*N_{total}/N+R-1$, the second RACH configuration information includes at least a second number $R_x$ of contention-based random access preambles allocated per SS/PBCH block on the one PRACH occasion, and information indicative of a first value $S_x$, and an index of the contention-based random access preamble used in the second random access procedure for the n-th SS/PBCH block on the certain PRACH occasion is selected from among indexes $(n-1)*N_{total}/N+S_x$ to $(n-1)*N_{total}/N+S_x+R_x-1$.

(2) A second aspect of the present invention provides a base station apparatus including a transmitter configured to transmit first RACH configuration information used in a first random access procedure and second RACH configuration information used in a second random access procedure, and a receiver configured to receive one random access preamble on a PRACH, wherein the first RACH configuration information includes at least information indicative of a first number Ntotal of random access preambles allocated on one PRACH occasion, information indicative of a first number N of SS/PBCH blocks allocated on the one PRACH occasion, and information indicative of a first number R of contention-based random access preambles allocated per SS/PBCH block on the one PRACH occasion, an index of the contention-based random access preamble used in the first random access procedure for an n-th SS/PBCH block on a certain PRACH occasion is selected from among indexes $(n-1)*N_{total}/N$ to $(n-1)*N_{total}/N+R-1$, the second RACH configuration information includes at least a second number $R_x$ of contention-based random access preambles allocated per SS/PBCH block on the one PRACH occasion, and information indicative of a first value $S_x$, and an index of the contention-based random access preamble used in the second random access procedure for the n-th SS/PBCH block on the certain PRACH occasion is selected from among indexes $(n-1)*N_{total}/N+S_x$ to $(n-1)*N_{total}/N+S_x+R_x-1$.

(3) A third aspect of the present invention is a communication method used in a terminal apparatus, the communication method including the steps of receiving first RACH configuration information used in a first random access procedure and second RACH configuration information used in a second random access procedure, and selecting one random access preamble and transmitting the random access preamble on a PRACH, wherein the first RACH configuration information includes at least information indicative of a first number $N_{total}$ of random access preambles allocated on one PRACH occasion, information indicative of a first number N of SS/PBCH blocks allocated on the one PRACH occasion, and information indicative of a first number R of contention-based random access preambles allocated per SS/PBCH block on the one PRACH occasion, an index of the contention-based random access preamble used in the first random access procedure for an n-th SS/PBCH block on a certain PRACH occasion is selected from among indexes $(n-1)*N_{total}/N$ to $(n-1)*N_{total}/N+R-1$, the second RACH configuration information includes at least a second number R. of contention-based random access preambles allocated per SS/PBCH block on the one PRACH occasion, and information indicative of a first value $S_x$, and an index of the contention-based random access preamble used in the second random access procedure for the n-th SS/PBCH block on the certain PRACH occasion is selected from among indexes $(n-1)*N_{total}/N+Sx$ to $(n-1)*N_{total}/N+S_x+R_x-1$.

(4) A fourth aspect of the present invention is a communication method used in a base station apparatus, the communication method including the steps of transmitting first RACH configuration information used in a first random access procedure and second RACH configuration information used in a second random access procedure, and receiving one random access preamble on a PRACH, wherein the first RACH configuration information includes at least information indicative of a first number Ntotal of random access preambles allocated on one PRACH occasion, information indicative of a first number N of SS/PBCH blocks allocated on the one PRACH occasion, and information indicative of a first number R of contention-based random access preambles allocated per SS/PBCH block on the one PRACH occasion, an index of the contention-based random access preamble used in the first random access procedure for an n-th SS/PBCH block on a certain PRACH occasion is selected from among indexes $(n-1)*N_{total}/N$ to $(n-1)*N_{total}/N+R-1$, the second RACH configuration information includes at least a second number $R_x$ of contention-based random access preambles allocated per SS/PBCH block on the one PRACH occasion, and information indicative of a first value $S_x$, and an index of the contention-based random access preamble used in the second random access procedure for the n-th SS/PBCH block on the certain PRACH occasion is selected from among indexes $(n-1)*N_{total}/N+S_x$ to $(n-1)*N_{total}/N+S_x+R_x-1$.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship between the subcarrier spacing configuration μ, the number $N^{slot}_{symb}$ of OFDM symbols per slot, and a cyclic prefix (CP) configuration according to an aspect of the present embodiment.

DESCRIPTION OF EMBODIMENTS

An embodiment of the present invention will be described below.

floor(C) may be a floor function for a real number C. For example, floor(C) may be a function that outputs a maximum integer in a range of not exceeding the real number C. ceil(D) may be a roof function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. exp(G)=e^G. Here, e is a Napier's constant. H^I represents H to the power of I. max(J, K) is a function that outputs the maximum value between J and K. Here, in a case that J and K are equal, max (J, K) is a function that outputs J or K. min(L, M) is a function that outputs the maximum value between L and M. Here, in a case that L and M are equal, min(L, M) is a function that outputs L or M. round(N) is a function that outputs an integer value closest to N.

In the radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol is converted into a time-continuous signal in baseband signal generation. In the downlink, Cyclic Prefix-Orthogonal Frequency Division Multiplex (CP-OFDM) is at least used. In the uplink, one of CP-OFDM or Discrete Fourier Transform-spread-Orthogonal Frequency Division Multiplex (DFT-s-OFDM) is used. With Transform precoding being applied to CP-OFDM, DFT-s-OFDM may be given.

The OFDM symbol may be a term including a CP added to the OFDM symbol. In other words, a certain OFDM symbol may include the certain OFDM symbol, and a CP added to the certain OFDM symbol.

Figure 1:
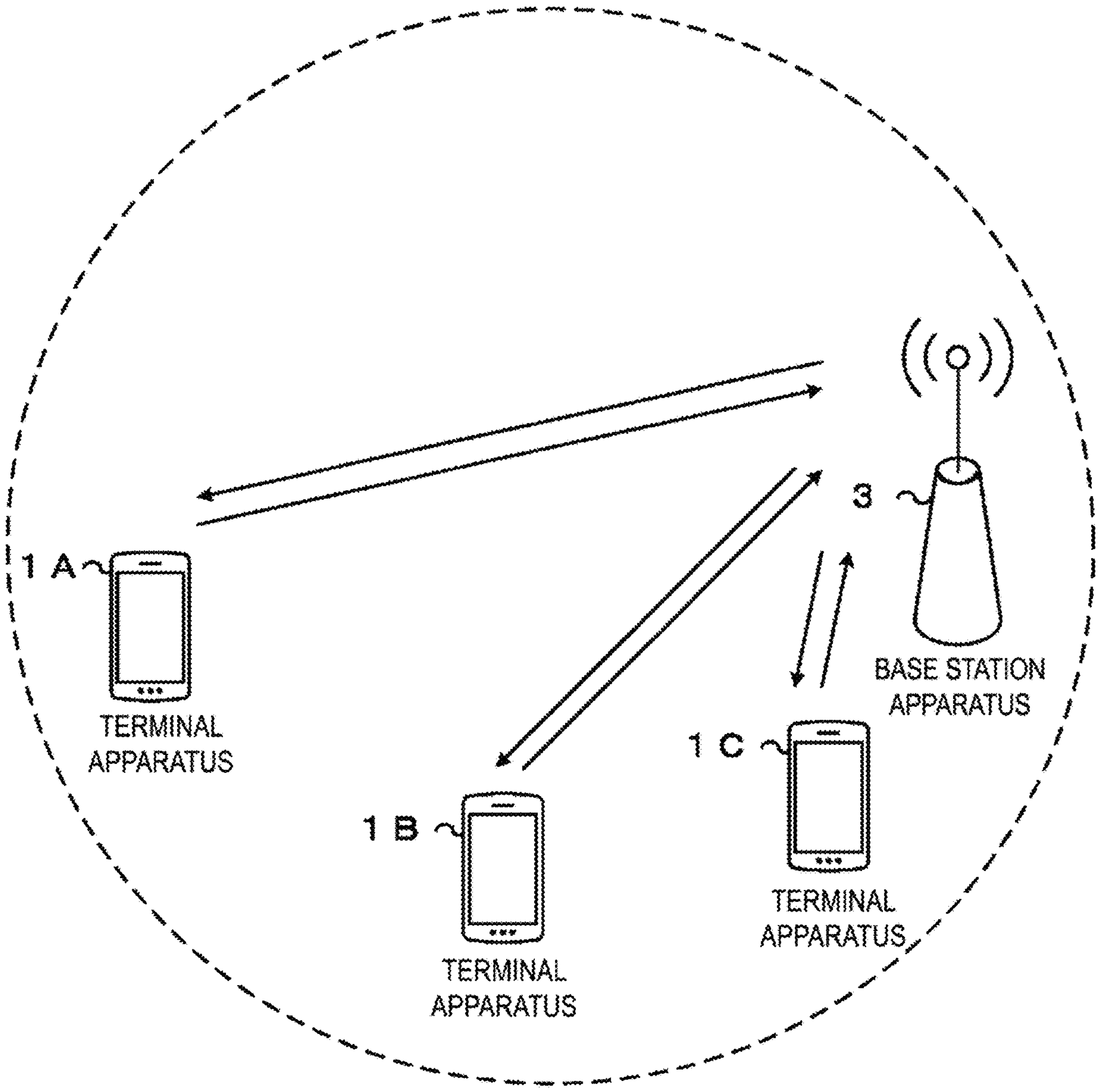
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system at least includes terminal apparatuses 1A to 1C and a base station apparatus 3 (base station #3 (BS #3)). The terminal apparatuses 1A to 1C are hereinafter also referred to as "terminal apparatus 1" (User Equipment #1 (UE #1)).

The base station apparatus 3 may include one or multiple transmission apparatuses (or transmission points, transmission and/or reception apparatuses, transmission and/or reception points). In a case that the base station apparatus 3 includes multiple transmission apparatuses, each of the multiple transmission apparatuses may be deployed at different positions.

The base station apparatus 3 may provide one or multiple serving cells. The serving cell may be defined as a set of resources used for radio communication. The serving cell is also referred to as a cell.

The serving cell may at least include one downlink component carrier (downlink carrier), and/or one uplink component carrier (uplink carrier). The serving cell may at least include two or more downlink component carriers, and/or two or more uplink component carriers. The downlink component carrier and the uplink component carrier are also referred to as "component carrier (carrier)".

For example, for one component carrier, one resource grid may be given. For one component carrier and a certain subcarrier spacing configuration p, one resource grid may be given. Here, the subcarrier spacing configuration p is also referred to as numerology. The resource grid includes $N^{size,\ \mu}_{grid,\ x}N^{RB}_{sc}$ subcarriers. The resource grid starts from a common resource block $N^{start,\mu}_{grid,x}$. The common resource block $N^{start,\ \mu}_{grid,\ x}$ is also referred to as a reference point of the resource grid. The resource grid includes $N^{subframe,\ \mu}_{symb}$ OFDM symbols. x is a subscript indicating a transmission direction, and indicates one of a downlink or an uplink. For a set of a certain antenna port p, a certain subcarrier spacing configuration μ, and a certain transmission direction x, one resource grid is given.

$N^{size,\ \mu}_{grid,\ x}$ and $N^{start,\ \mu}_{grid,\ x}$ are given based on at least a higher layer parameter (CarrierBandwidth). The higher layer parameter is also referred to as an SCS specific carrier. One resource grid corresponds to one SCS specific carrier. One component carrier may include one or multiple SCS specific carriers. The SCS specific carrier may be included in system information. For each of the SCS specific carriers, one subcarrier spacing configuration p may be given.

The SubCarrier Spacing (SCS) Δf may be $\Delta f=2\mu\cdot 15$ kHz. For example, the subcarrier spacing configuration p may indicate one of 0, 1, 2, 3, or 4.

FIG. 2 is an example illustrating a relationship between a subcarrier spacing configuration μ, the number $N^{slot}_{symb}$ of OFDM symbols per slot, and a cyclic Prefix (CP) configuration according to an aspect of the present embodiment. In FIG. 2A, for example, in a case that the subcarrier spacing configuration p is two and the CP configuration is a normal cyclic prefix (normal CP), $N^{slot}_{symb}=14$, $N^{frame,\ \mu}_{slot}=40$, and $N^{subframe,\ \mu}_{slot}=4$. In FIG. 2B, for example, in a case that the subcarrier spacing configuration μ is two and the CP configuration is an extended cyclic prefix (extended CP), $N^{slot}_{symb}=12$, $N^{frame,\ \mu}_{slot}=40$, and $N^{subframe,\ \mu}_{slot}=4$.

In the radio communication system according to an aspect of the present embodiment, time unit $T_c$ may be used for expression of the length of the time domain. The time unit $T_c$ is $T_c=1/(\Delta f_{max}\cdot N_f)$. $\Delta f_{max}=480$ kHz. $N_f=4096$. A constant κ is $\kappa=\Delta f_{max}\cdot N_f/(\Delta f_{ref}N_{f,\ ref})=64$. $\Delta f_{ref}$ is 15 kHz. $N_{f,\ ref}$ is 2048.

Transmission of a signal in the downlink and/or transmission of a signal in the uplink may be organized into a radio frame (system frame, frame) having a length $T_f$. $T_f=(\Delta f_{max}N_f/100)\cdot T_s=10$ ms. "·" represents multiplication.

The radio frame includes 10 subframes. The length $T_{sf}$ of the subframe is $(\Delta f_{max}N_f/1000)\cdot T_s=1$ ms. The number of OFDM symbols per subframe is $N^{subframe,\ \mu}_{symb}=N^{slot}_{symb}N^{subframe,\ \mu}_{slot}$.

For a certain subcarrier spacing configuration μ, the number and indexes of slots included in a subframe may be provided. For example, slot indexes $n^{\mu}_{s}$ may be given in ascending order with integer values in the range from 0 to $N^{subframe,\ \mu}_{slot}-1$ in the subframe. For the subcarrier spacing configuration μ, the number and indexes of slots included in the radio frame may be given. Slot indexes $n^{\mu}_{s,\ f}$ may be given in ascending order with integer values in the range from 0 to $N^{frame,\ \mu}_{slot}-1$ in the radio frame. $N^{slot}_{symb}$ continuous OFDM symbols may be included in one slot. $N^{slot}_{symb}=14$.

Figure 3:
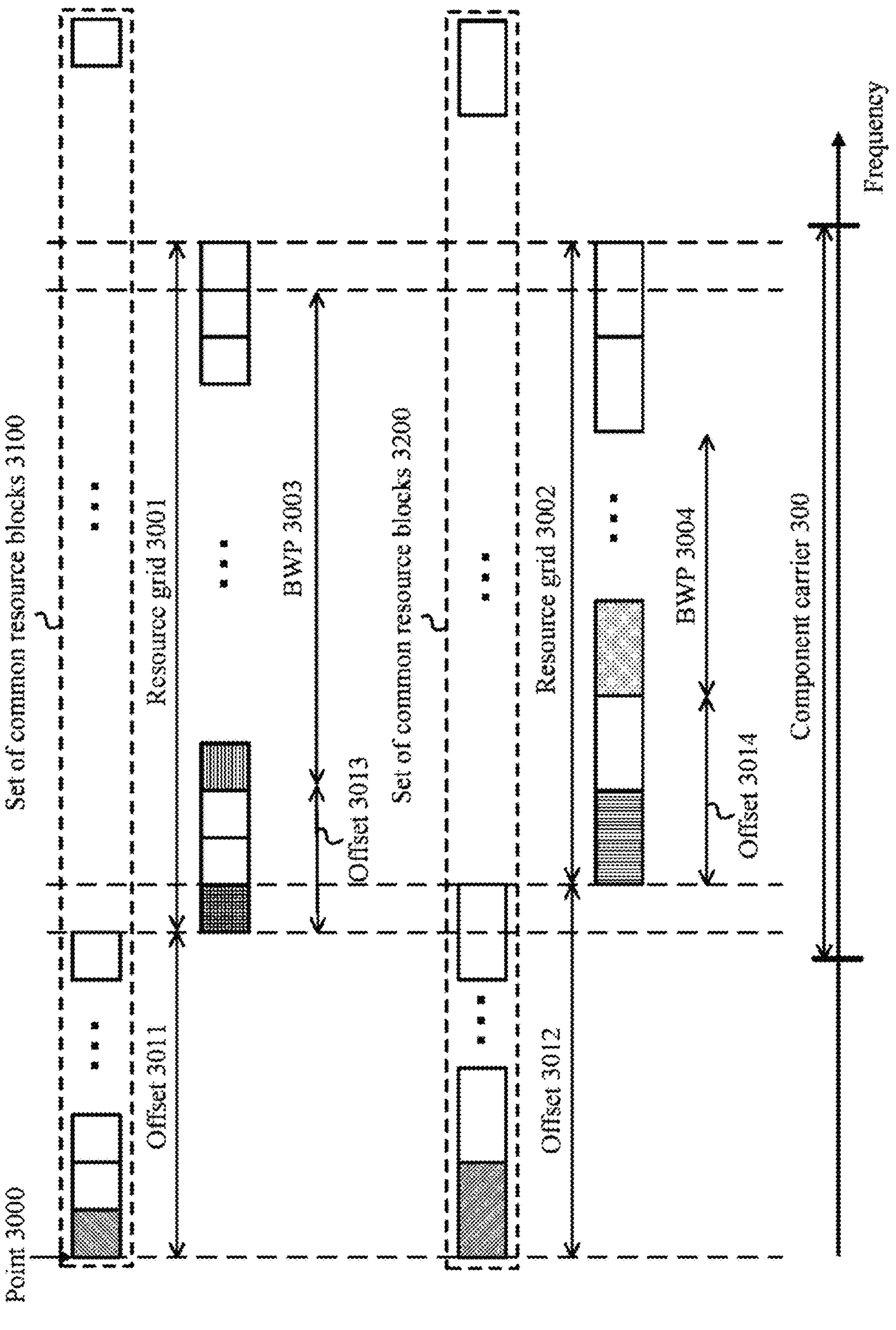
FIG. 3 is a diagram illustrating an example of a configuration method of a resource grid according to an aspect of the present embodiment.

FIG. 3 is a diagram illustrating an example of a configuration method of the resource grid according to an aspect of the present embodiment. The horizontal axis of FIG. 3 represents a frequency domain. FIG. 3 illustrates a configuration example of a resource grid of a subcarrier spacing $\mu_1$ in a component carrier 300, and a configuration example of a resource grid of subcarrier spacing $\mu_2$ in the certain component carrier. As described above, for a certain component carrier, one or multiple subcarrier spacings may be configured. In FIG. 3, it is assumed that $\mu_1=\mu_2-1$. However, various aspects of the present embodiment are not limited to the condition of $\mu_1=\mu_2-1$.

The component carrier 300 is a band having a prescribed width in the frequency domain.

A Point 3000 is an identifier for identifying a certain subcarrier. The point 3000 is also referred to as a point A. A set 3100 of Common resource blocks (CRBs) is a set of common resource blocks for the subcarrier spacing configuration $\mu_1$.

Of the common resource block set 3100, a common resource block (block hatched with lines rising diagonally up and to the right in FIG. 3) including the point 3000 is also referred to as a reference point of the common resource block set 3100. The reference point of the common resource block set 3100 may be a common resource block having an index of 0 in the common resource block set 3100.

An offset 3011 is an offset from the reference point of the common resource block set 3100 to a reference point of a resource grid 3001. The offset 3011 is represented by the number of common resource blocks for the subcarrier spacing configuration $\mu_1$. The resource grid 3001 includes $N^{size,\ \mu}_{grid1,\ x}$ common resource blocks starting from the reference point of the resource grid 3001.

An offset 3013 is an offset from the reference point of the resource grid 3001 to a reference point ($N^{start,\ \mu}_{BWP,\ i1}$) of a Bandwidth Part (BWP) 3003 having an index of i1.

A common resource block set 3200 is a set of common resource blocks for the subcarrier spacing configuration $\mu_2$.

Of the common resource block set 3200, a common resource block (block hatched with lines rising diagonally up and to the left in FIG. 3) including the point 3000 is also referred to as a reference point of the common resource block set 3200. The reference point of the common resource block set 3200 may be a common resource block having an index of 0 in the common resource block set 3200.

An offset 3012 is an offset from the reference point of the common resource block set 3200 to a reference point of a resource grid 3002. The offset 3012 is represented by the number of common resource blocks for the subcarrier spacing $\mu_2$. The resource grid 3002 includes NW's, $\mu_{grid2,\ x}$ common resource blocks starting from the reference point of the resource grid 3002.

An offset 3014 is an offset from the reference point of the resource grid 3002 to a reference point ($N^{start,\mu}_{BWP,i2}$) of a BWP 3004 having an index of i2.

Figure 4:
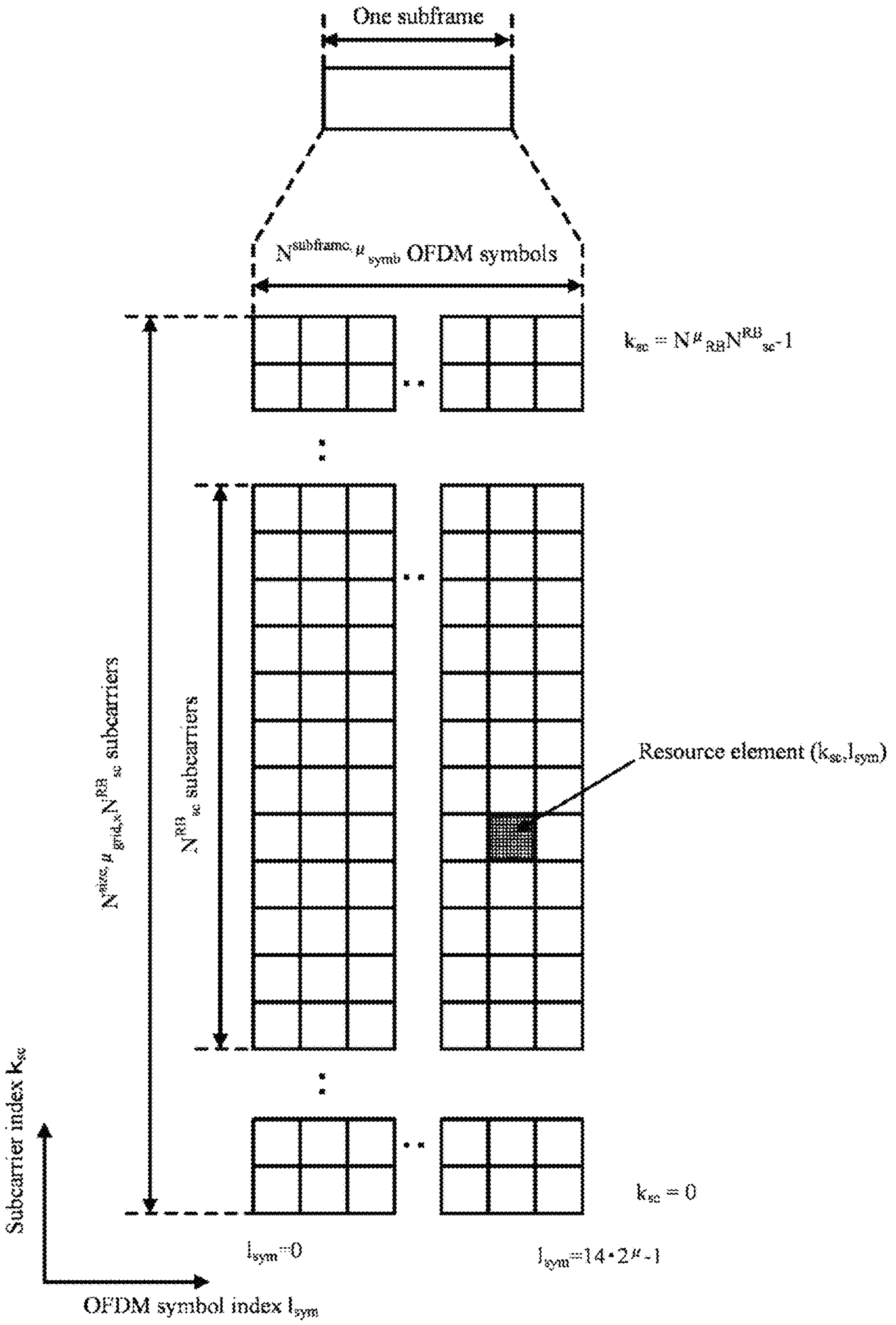
FIG. 4 is a diagram illustrating a configuration example of a resource grid 3001 according to an aspect of the present embodiment.

FIG. 4 is a diagram illustrating a configuration example of the resource grid 3001 according to an aspect of the present embodiment. In the resource grid of FIG. 4, the horizontal axis corresponds to an OFDM symbol index $1_{sym}$, and the vertical axis corresponds to a subcarrier index $k_{sc}$. The resource grid 3001 includes $N^{size,\mu}_{grid1,x}N^{RB}_{sc}$ subcarriers, and $N^{subframe,\mu}_{symb}$ OFDM symbols. In the resource grid, a resource identified with the subcarrier index $k_{sc}$ and the OFDM symbol index $1_{sym}$ is also referred to as a Resource Element (RE).

The Resource Block (RB) includes $N^{RB}_{sc}$ continuous subcarriers. The resource block is a general term for a common resource block, a Physical Resource Block (PRB), and a Virtual Resource Block (VRB). Here, $N^{RB}_{sc}=12$.

A resource block unit is a set of resources corresponding to one OFDM symbol in one resource block. In other words, one resource block unit includes 12 resource elements corresponding to one OFDM symbol in one resource block.

The common resource blocks for a certain subcarrier spacing configuration p are assigned with indexes (indexing) in ascending order from 0 in the frequency domain in a certain common resource block set. The common resource block having an index of 0 for a certain subcarrier spacing configuration p includes (or collides with, matches) the point 3000. An index $n^{\mu}_{CRB}$ of the common resource block for a certain subcarrier spacing configuration p satisfies a relationship of $n^{\mu}_{CRB}=\text{ceil}(k_{sc}/N^{RB}_{sc})$. Here, a subcarrier with $k_{sc}=0$ is a subcarrier having the same center frequency as the center frequency of a subcarrier corresponding to the point 3000.

The physical resource blocks for a certain subcarrier spacing configuration p are assigned with indexes in ascending order from 0 in the frequency domain in a certain BWP. An index $n^{\mu}_{PRB}$ of the physical resource block for a certain subcarrier spacing configuration p satisfies a relationship of $n^{\mu}_{CRB}=n^{\mu}_{PRB}+N^{start,\mu}_{BWP,i}$. Here, $N^{start,\mu}_{BWP,i}$ indicates a reference point of the BWP having an index of i.

The BWP is defined as a subset of common resource blocks included in the resource grid. The BWP includes $N^{size,\mu}_{BWP,i}$ common resource blocks starting from the reference point $N^{start,\mu}_{BWP,i}$ of the BWP. A BWP configured for a downlink carrier is also referred to as a downlink BWP. The BWP configured for the uplink component carrier is also referred to as an uplink BWP.

An antenna port may be defined by that a channel on which a symbol in a certain antenna port is conveyed can be inferred from a channel on which another symbol in the certain antenna port is conveyed (An antenna port is defined such that the channel over which a symbol on the antenna port is conveyed can be inferred from the channel over which another symbol on the same antenna port is conveyed). For example, the channel may correspond to a physical channel. The symbol may correspond to an OFDM symbol. The symbol may correspond to a resource block unit. The symbol may correspond to a resource element.

The fact that large scale property of a channel on which a symbol is conveyed in one antenna port can be inferred from a channel on which a symbol is conveyed in another antenna port is described that the two antenna ports are quasi co-located (QCL). The large scale property may at least include long term performance of a channel. The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a receiver for the first antenna port and a receive beam assumed by the receiver for the second antenna port are the same. The fact that the first antenna port and the second antenna port are QCL with respect to a beam parameter may mean that a transmit beam assumed by a receiver for the first antenna port and a transmit beam assumed by the receiver for the second antenna port are the same. In a case that the large scale property of a channel through which a symbol is transmitted in one antenna port can be estimated from a channel through which a symbol is transmitted in another antenna port, the terminal apparatus 1 may assume that the two antenna ports are QCL. The fact that two antenna ports are QCL may mean that it is assumed that the two antenna ports are QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated. Carrier aggregation may mean that communication is performed by using multiple uplink component carriers being aggregated.

Figure 5:
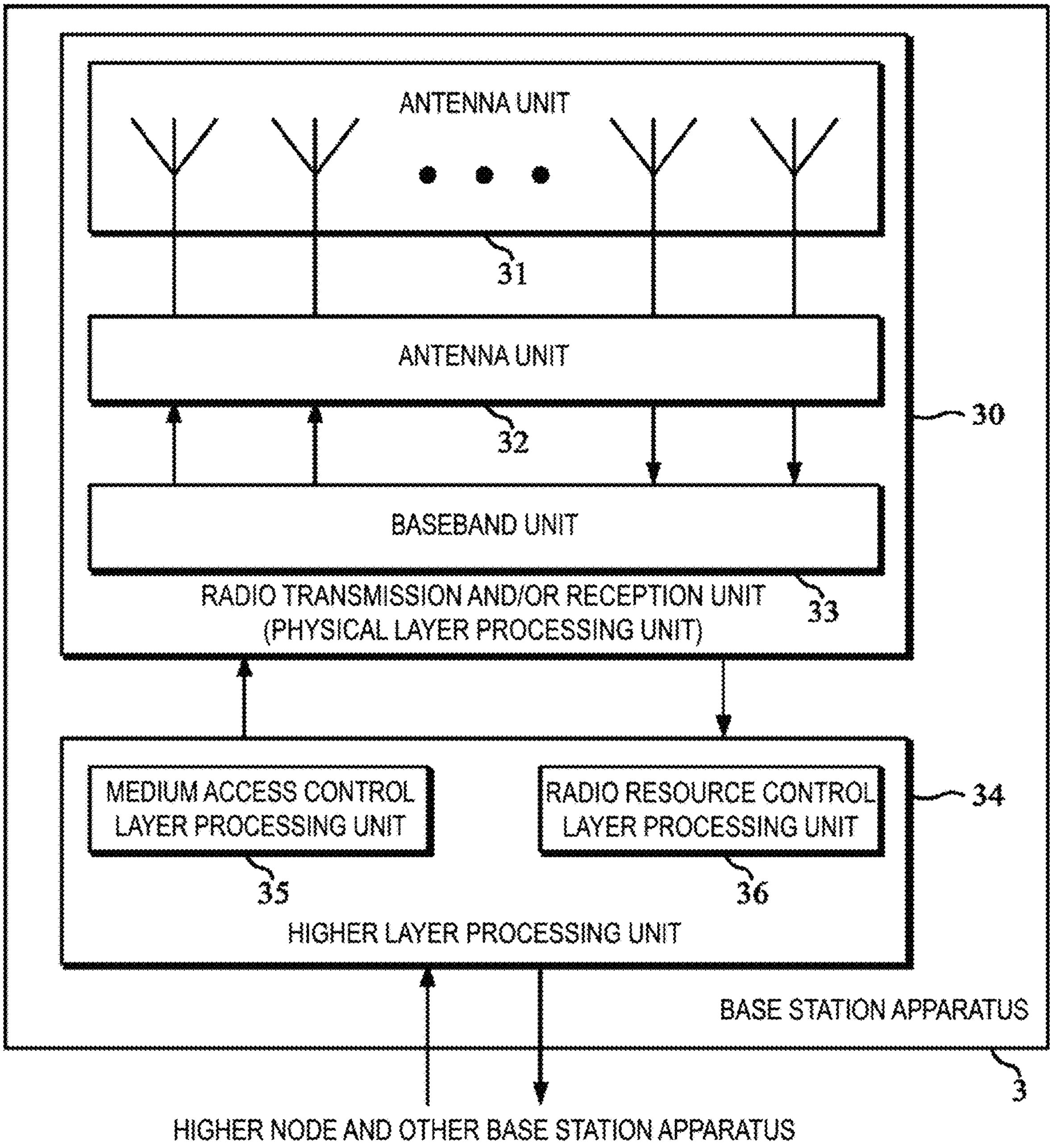
FIG. 5 is a schematic block diagram illustrating a configuration example of a base station apparatus 3 according to an aspect of the present embodiment.

FIG. 5 is a schematic block diagram illustrating a configuration example of the base station apparatus 3 according to an aspect of the present embodiment. As illustrated in FIG. 5, the base station apparatus 3 at least includes a part or all of a radio transmission and/or reception unit (physical layer processing unit) 30 and/or a higher layer processing unit 34. The radio transmission and/or reception unit 30 at least includes a part or all of an antenna unit 31, a Radio Frequency (RF) unit 32, and a baseband unit 33. The higher layer processing unit 34 at least includes a part or all of a medium access control layer processing unit 35 and a Radio Resource Control (RRC) layer processing unit 36.

The radio transmission and/or reception unit 30 at least includes a part or all of a radio transmitting unit **30*a* and a radio receiving unit 30*b*. Here, apparatus configurations of the baseband unit included in the radio transmitting unit 30*a* and the baseband unit included in the radio receiving unit 30*b* may be the same or different from each other. Apparatus configurations of the RF unit included in the radio transmitting unit 30*a* and the RF unit included in the radio receiving unit 30*b* may be the same or different from each other. Apparatus configurations of the antenna unit included in the radio transmitting unit 30*a* and the antenna unit included in the radio receiving unit 30*b*** may be the same or different from each other.

For example, the radio transmitting unit **30*a* may generate and transmit a baseband signal of a PDSCH. For example, the radio transmitting unit 30*a* may generate and transmit a baseband signal of a PDCCH. For example, the radio transmitting unit 30*a* may generate and transmit a baseband signal of a PBCH. For example, the radio transmitting unit 30*a* may generate and transmit a baseband signal of a synchronization signal. For example, the radio transmitting unit 30*a* may generate and transmit a baseband signal of a PDSCH DMRS. For example, the radio transmitting unit 30*a* may generate and transmit a baseband signal of a PDCCH DMRS. For example, the radio transmitting unit 30*a* may generate and transmit a baseband signal of a CSI-RS. For example, the radio transmitting unit 30*a*** may generate and transmit a baseband signal of a DL PTRS.

For example, the radio receiving unit **30*b* may receive a PRACH. For example, the radio receiving unit 30*b* may receive and demodulate a PUCCH. The radio receiving unit 30***b* may receive and demodulate a PUSCH. For example, the radio receiving unit 30*b* may receive a PUCCH DMRS. For example, the radio receiving unit 30*b* may receive a PUSCH DMRS. For example, the radio receiving unit 30*b* may receive a UL PTRS. For example, the radio receiving unit 30*b* may receive an SRS.

The higher layer processing unit 34 outputs downlink data (transport block) to the radio transmission and/or reception unit 30 (or the radio transmitting unit 30*a*). The higher layer processing unit 34 performs processing of a Medium Access Control (MAC) layer, a Packet Data Convergence Protocol (PDCP) layer, a Radio Link Control (RLC) layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 manages various pieces of configuration information/parameters (RRC parameters) of the terminal apparatus 1. The radio resource control layer processing unit 36 sets the RRC parameter, based on an RRC message received from the terminal apparatus 1.

The radio transmission and/or reception unit 30 (or the radio transmitting unit 30*a*) performs processing such as modulation and coding. The radio transmission and/or reception unit 30 (or the radio transmitting unit 30*a*) performs modulation, coding, baseband signal generation (conversion into a time-continuous signal) on downlink data to generate a physical signal, and transmits the physical signal to the terminal apparatus 1. The radio transmission and/or reception unit 30 (or the radio transmitting unit 30*a*) may map the physical signal to a certain component carrier, and transmit the mapped physical signal to the terminal apparatus 1.

The radio transmission and/or reception unit 30 (or the radio receiving unit 30*b*) performs processing such as demodulation and decoding. The radio transmission and/or reception unit 30 (or the radio receiving unit 30*b*) separates, demodulates, and decodes a received physical signal, and outputs decoded information to the higher layer processing unit 34. The radio transmission and/or reception unit 30 (or the radio receiving unit 30*b*) may perform a channel access procedure prior to transmission of the physical signal.

The RF unit 32 converts (down converts) a signal received via the antenna unit 31 into a baseband signal by means of orthogonal demodulation, and removes unnecessary frequency components. The RF unit 32 outputs a processed analog signal to the baseband unit.

The baseband unit 33 converts an analog signal input from the RF unit 32 into a digital signal. The baseband unit 33 removes a portion corresponding to a Cyclic Prefix (CP) from the converted digital signal, performs a Fast Fourier Transform (FFT) on the signal from which the CP has been removed, and extracts a signal in the frequency domain.

The baseband unit 33 performs inverse fast Fourier transform (IFFT) on data to generate an OFDM symbol, adds a CP to the generated OFDM symbol, generates a baseband digital signal, and converts the baseband digital signal into an analog signal. The baseband unit 33 outputs the converted analog signal to the RF unit 32.

The RF unit 32 removes an unnecessary frequency component from the analog signal input from the baseband unit 33 by using a low-pass filter, up converts the analog signal into a carrier frequency, and transmits the converted analog signal via the antenna unit 31. The RF unit 32 may have a function of controlling transmission power. The RF unit 32 is also referred to as a transmission power control unit.

For the terminal apparatus 1, one or multiple serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell).

The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which random access is performed by the terminal apparatus 1 in a reconfiguration procedure with synchronization (Reconfirmation with synchronization).

The SCell may be included in one of the MCG or the SCG.

A serving cell group (cell group) is a term at least including an MCG and an SCG. The serving cell group may include one or multiple serving cells (or component carriers). One or multiple serving cells (or component carriers) included in the serving cell group may be operated by means of carrier aggregation.

One or multiple downlink BWPs may be configured for each of the serving cells (or downlink component carriers). One or multiple uplink BWPs may be configured for each of the serving cells (or uplink component carriers).

Among one or multiple downlink BWPs configured for the serving cell (or the downlink component carrier), one downlink BWP may be configured as an active downlink BWP (or one downlink BWP may be activated). Among one or multiple uplink BWPs configured for the serving cell (or the uplink component carrier), one uplink BWP may be configured as an active uplink BWP (or one uplink BWP may be activated).

The PDSCH, the PDCCH, and the CSI-RS may be received in the active downlink BWP. The terminal apparatus 1 may receive the PDSCH, the PDCCH, and the CSI-RS in the active downlink BWP. The PUCCH and the PUSCH may be transmitted in the active uplink BWP. The terminal apparatus 1 may transmit the PUCCH and the PUSCH in the active uplink BWP. The active downlink BWP and the active uplink BWP are also referred to as an active BWP.

The PDSCH, the PDCCH, and the CSI-RS need not be received in downlink BWPs (inactive downlink BWPs) other than the active downlink BWP. The terminal apparatus 1 need not receive the PDSCH, the PDCCH, and the CSI-RS in the downlink BWP other than the active downlink BWP. The PUCCH and the PUSCH need not be transmitted in uplink BWPs (inactive uplink BWPs) other than the active uplink BWP. The terminal apparatus 1 need not transmit the PUCCH and the PUSCH in an uplink BWP other than the active uplink BWP. The inactive downlink BWP and the inactive uplink BWP are also referred to as an inactive BWP.

Downlink BWP switch is used for deactivating one active downlink BWP, and activating any one of the inactive downlink BWPs other than the one active downlink BWP. The downlink BWP switch may be controlled by a BWP field included in downlink control information. The downlink BWP switch may be controlled based on a higher layer parameter.

Uplink BWP switch is used for deactivating one active uplink BWP, and activating any one of the inactive uplink BWPs other than the one active uplink BWP. The uplink BWP switch may be controlled by a BWP field included in downlink control information. The uplink BWP switch may be controlled based on a higher layer parameter.

Among one or multiple downlink BWPs configured for the serving cell, two or more downlink BWPs need not be configured for the active downlink BWP. For the serving cell, at certain time, one downlink BWP may be active.

Among one or multiple uplink BWPs configured for the serving cell, two or more uplink BWPs need not be configured for the active uplink BWP. For the serving cell, at certain time, one uplink BWP may be active.

Figure 6:
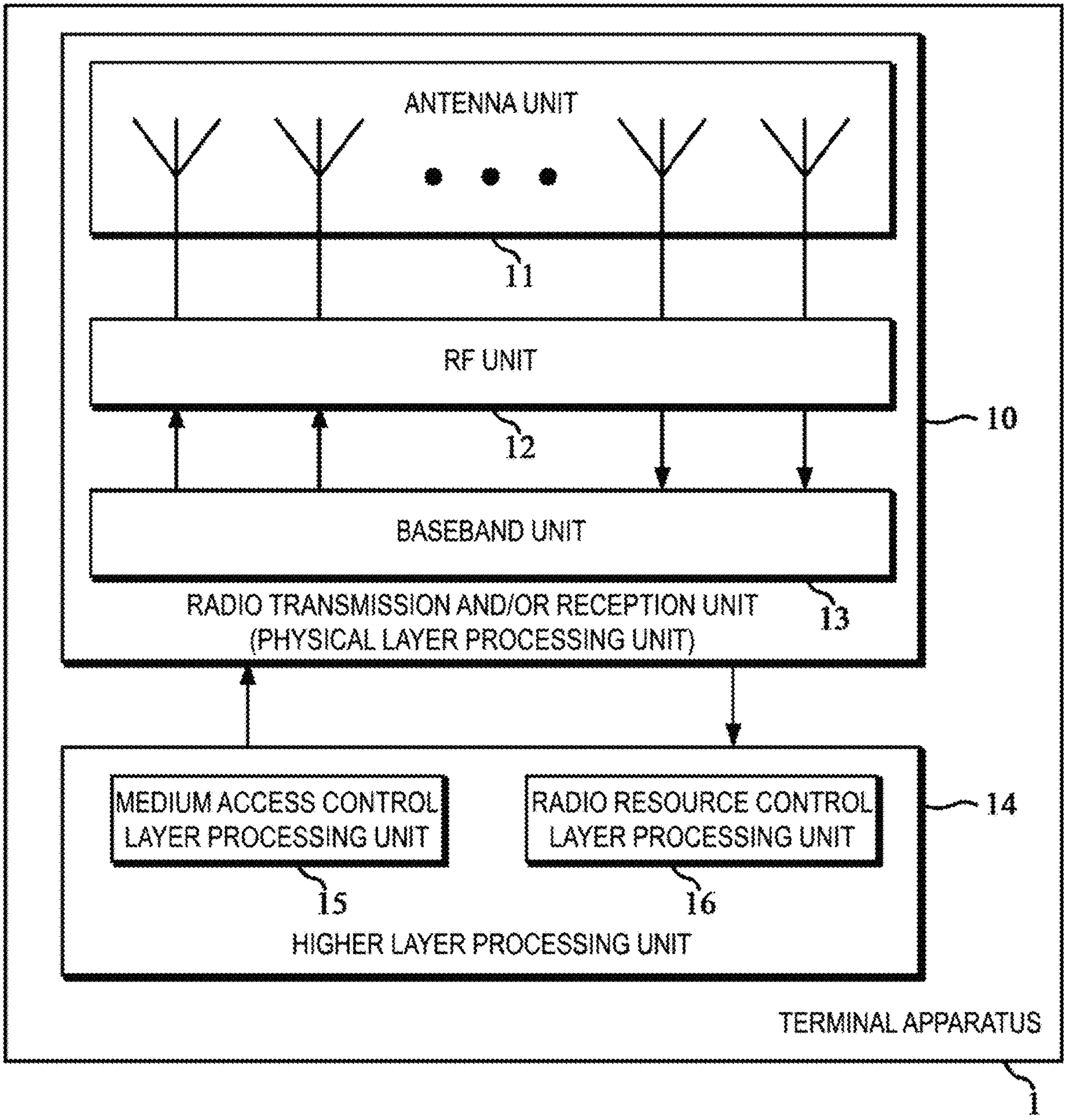
FIG. 6 is a schematic block diagram illustrating a configuration example of a terminal apparatus 1 according to an aspect of the present embodiment.

FIG. 6 is a schematic block diagram illustrating a configuration example of the terminal apparatus 1 according to an aspect of the present embodiment. As illustrated in FIG. 6, the terminal apparatus 1 at least includes one or all of a radio transmission and/or reception unit (physical layer processing unit) 10 and a higher layer processing unit 14. The radio transmission and/or reception unit 10 at least includes a part or all of an antenna unit 11, an RF unit 12, and a baseband unit 13. The higher layer processing unit 14 at least includes a part or all of a medium access control layer processing unit 15 and a radio resource control layer processing unit 16.

The radio transmission and/or reception unit 10 at least includes a part or all of a radio transmitting unit 10*a* and a radio receiving unit 10*b*. Here, apparatus configurations of the baseband unit 13 included in the radio transmitting unit 10*a* and the baseband unit 13 included in the radio receiving unit 10*b* may be the same or different from each other. Apparatus configurations of the RF unit 12 included in the radio transmitting unit 10*a* and the RF unit 12 included in the radio receiving unit 10*b* may be the same or different from each other. Apparatus configurations of the antenna unit 11 included in the radio transmitting unit 10*a* and the antenna unit 11 included in the radio receiving unit 10*b* may be the same or different from each other.

For example, the radio transmitting unit 10*a* may generate and transmit a baseband signal of a PRACH. For example, the radio transmitting unit 10*a* may generate and transmit a baseband signal of a PUCCH. The radio transmitting unit 10*a* may generate and transmit a baseband signal of a PUSCH. For example, the radio transmitting unit 10*a* may generate and transmit a baseband signal of a PUCCH DMRS. For example, the radio transmitting unit 10*a* may generate and transmit a baseband signal of a PUSCH DMRS. For example, the radio transmitting unit 10*a* may generate and transmit a baseband signal of a UL PTRS. For example, the radio transmitting unit 10*a* may generate and transmit a baseband signal of an SRS.

For example, the radio receiving unit 10*b* may receive and demodulate a PDSCH. For example, the radio receiving unit 10*b* may receive and demodulate a PDCCH. For example, the radio receiving unit 10*b* may receive and demodulate a PBCH. For example, the radio receiving unit 10*b* may receive a synchronization signal. For example, the radio receiving unit 10*b* may receive a PDSCH DMRS. For example, the radio receiving unit 10*b* may receive a PDCCH DMRS. For example, the radio receiving unit 10*b* may receive a CSI-RS. For example, the radio receiving unit 10*b* may receive a DL PTRS.

The higher layer processing unit 14 outputs uplink data (transport block) to the radio transmission and/or reception unit 10 (or the radio transmitting unit 10*a*). The higher layer processing unit 14 performs processing of the MAC layer, the packet data convergence protocol layer, the radio link control layer, and the RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various pieces of configuration information/parameters (RRC parameters) of the terminal apparatus 1. The radio resource control layer processing unit 16 sets the RRC parameters, based on an RRC message received from the base station apparatus 3.

The radio transmission and/or reception unit 10 (or the radio transmitting unit 10*a*) performs processing such as modulation and coding. The radio transmission and/or reception unit 10 (or the radio transmitting unit 10*a*) performs modulation, coding, baseband signal generation (conversion into a time-continuous signal) on uplink data to generate a physical signal, and transmits the physical signal to the base station apparatus 3. The radio transmission and/or reception unit 10 (or the radio transmitting unit 10*a*) may map the physical signal to a certain BWP (active uplink BWP), and transmit the mapped physical signal to the base station apparatus 3.

The radio transmission and/or reception unit 10 (or the radio receiving unit 10*b*) performs processing such as demodulation and decoding. The radio transmission and/or reception unit 10 (or the radio receiving unit 30*b*) may receive a physical signal in a certain BWP (active downlink BWP) of a certain serving cell. The radio transmission and/or reception unit 10 (or the radio receiving unit 10*b*) separates, demodulates, and decodes the received physical signal, and outputs decoded information to the higher layer processing unit 14. The radio transmission and/or reception unit 10 (radio receiving unit 10*b*) may perform a channel access procedure prior to transmission of the physical signal.

The RF unit 12 converts (down converts) a signal received via the antenna unit 11 into a baseband signal by means of orthogonal demodulation, and removes an unnecessary frequency component. The RF unit 12 outputs a processed analog signal to the baseband unit 13.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed and extracts a signal in the frequency domain.

The baseband unit 13 performs inverse fast Fourier transform (IFFT) on uplink data to generate an OFDM symbol, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 may have a function of controlling transmission power. The RF unit 12 is also referred to as a transmission power control unit.

The physical signal (signal) will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for carrying information that is generated in a higher layer. The uplink physical channel may be a physical channel used in the uplink component carrier. The uplink physical channel may be transmitted by the terminal apparatus 1. The uplink physical channel may be received by the base station apparatus 3. In the radio communication system according to an aspect of the present embodiment, at least a part or all of the following uplink physical channels may be used.

Physical Uplink Control CHannel (PUCCH)

Physical Uplink Shared CHannel (PUSCH)

Physical Random Access CHannel (PRACH)

The PUCCH may be used to transmit Uplink Control Information (UCI). The PUCCH may be transmitted for conveying (delivering, transmitting) the uplink control information. The uplink control information may be mapped to the PUCCH. The terminal apparatus 1 may transmit the PUCCH to which the uplink control information is mapped. The base station apparatus 3 may receive the PUCCH to which the uplink control information is mapped.

The uplink control information (uplink control information bit, uplink control information sequence, uplink control information type) at least includes a part or all of Channel State Information (CSI), a Scheduling Request (SR), and Hybrid Automatic Repeat request Acknowledgement (HARQ-ACK) information.

The channel state information is also referred to as a channel state information bit or a channel state information sequence. The scheduling request is also referred to as a scheduling request bit or a scheduling request sequence. The HARQ-ACK information is also referred to as an HARQ-ACK information bit or an HARQ-ACK information sequence.

The HARQ-ACK information may at least include an HARQ-ACK corresponding to a Transport block (or TB, Medium Access Control Protocol Data Unit (MAC PDU), Downlink-Shared Channel (DL-SCH), Uplink-Shared Channel (UL-SCH), Physical Downlink Shared Channel (PDSCH), Physical Uplink Shared Channel (PUSCH)). The HARQ-ACK may indicate an acknowledgement (ACK) or a negative-acknowledgement (NACK) corresponding to the transport block. The ACK may indicate that decoding of the transport block has been completed successfully (has been decoded). The NACK may indicate that decoding of the transport block has not completed successfully (has not been decoded). The HARQ-ACK information may include an HARQ-ACK codebook including one or multiple HARQ-ACK bits.

The fact that the HARQ-ACK information and the transport block correspond to each other may mean that the HARQ-ACK information and the PDSCH used for conveying the transport block correspond to each other.

The HARQ-ACK may indicate an ACK or a NACK corresponding to one Code Block Group (CBG) included in the transport block.

The scheduling request may be at least used for requesting a resource of the PUSCH (or the UL-SCH) for initial transmission (new transmission). The scheduling request bit may be used for indicating one of a positive SR or a negative SR. The scheduling request bit indicating the positive SR is also referred to as "the positive SR being transmitted". The positive SR may indicate that a resource of the PUSCH (or the UL-SCH) for initial transmission is requested by the terminal apparatus 1. The positive SR may indicate that a scheduling request is triggered by a higher layer. The positive SR may be transmitted in a case that the higher layer indicates transmission of the scheduling request. The scheduling request bit indicating the negative SR is also referred to as "the negative SR being transmitted". The negative SR may indicate that a resource of the PUSCH (or the UL-SCH) for initial transmission is not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least some or all of a Channel Quality Indicator (CQI), a Precoder Matrix Indicator (PMI), and a Rank Indicator (RI). The CQI is an indicator related to quality (for example, propagation strength) of a channel or quality of a physical channel, and the PMI is an indicator related to a precoder. The RI is an indicator related to a transmission rank (or the number of transmission layers).

The channel state information may be given based at least on reception of a physical signal (for example, a CSI-RS) at least used for channel measurement. The channel state information may be selected by the terminal apparatus 1, based at least on reception of the physical signal at least used for channel measurement. Channel measurement may include interference measurement.

The PUCCH may correspond to a PUCCH format. The PUCCH may be a set of resource elements used for conveying the PUCCH format. The PUCCH may include the PUCCH format.

The PUSCH may be used for transmitting a transport block and/or uplink control information. The PUSCH may be used for transmitting the transport block and/or the uplink control information corresponding to the UL-SCH. The PUSCH may be used for conveying the transport block and/or the uplink control information. The PUSCH may be used for conveying the transport block and/or the uplink control information corresponding to the UL-SCH. The transport block may be mapped to the PUSCH. The transport block corresponding to the UL-SCH may be mapped to the PUSCH. The uplink control information may be mapped to the PUSCH. The terminal apparatus 1 may transmit the PUSCH to which the transport block and/or the uplink control information is mapped. The base station apparatus 3 may receive the PUSCH to which the transport block and/or the uplink control information is mapped.

The PRACH may be used for transmitting a random access preamble. The PRACH may be used for conveying a random access preamble. A PRACH sequence $x_{u,v}(n)$ is defined by $x_{u,v}(n)=x_u(\mathrm{mod}(n+C_v, L_{RA}))$. $x_u$ may be a Zadoff-Chu (ZC) sequence. $x_u$ is defined by $x_u=\exp(-j\pi ui\,(i+1)/L_{RA})$. j is an imaginary unit. π is ratio of the circumference of a circle to its diameter. $C_v$ corresponds to a cyclic shift of the PRACH sequence. $L_{RA}$ corresponds to the length of the PRACH sequence. $L_{RA}$ is 839, or 139. i is an integer in the range from 0 to $L_{RA}-1$. u is a sequence index for the PRACH sequence. The terminal apparatus 1 may transmit the PRACH. The base station apparatus 3 may receive the PRACH.

For a certain PRACH occasion, 64 random access preambles are defined. The random access preamble is identified (determined, given) based on at least the cyclic shift $C_v$ of the PRACH sequence and the sequence index u for the PRACH sequence. Each of the 64 identified random access preambles may be indexed.

The uplink physical signal may correspond to a set of resource elements. The uplink physical signal need not carry information generated in a higher layer. The uplink physical signal may be a physical signal used in the uplink component carrier. The terminal apparatus 1 may transmit the uplink physical signal. The base station apparatus 3 may receive the uplink physical signal. In the radio communication system according to an aspect of the present embodiment, at least a part or all of the following uplink physical signals may be used.

UpLink Demodulation Reference Signal (UL DMRS)
Sounding Reference Signal (SRS)
UpLink Phase Tracking Reference Signal (UL PTRS)

The UL DMRS is a general term for a DMRS for the PUSCH and a DMRS for the PUCCH.

A set of antenna ports of the DMRS for the PUSCH (DMRS related to the PUSCH, DMRS included in the PUSCH, DMRS corresponding to the PUSCH) may be given based on a set of antenna ports for the PUSCH. In other words, the set of antenna ports of the DMRS for the PUSCH may be the same as a set of antenna ports of the PUSCH.

Transmission of the PUSCH and transmission of the DMRS for the PUSCH may be indicated by one DCI format (or may be scheduled). The PUSCH and the DMRS for the PUSCH may be collectively referred to as a PUSCH. Transmission of the PUSCH may mean transmission of the PUSCH and the DMRS for the PUSCH.

The PUSCH may be inferred from the DMRS for the PUSCH. In other words, a channel (propagation path) of the PUSCH may be inferred from the DMRS for the PUSCH.

A set of antenna ports of the DMRS for the PUCCH (DMRS related to the PUCCH, DMRS included in the PUCCH, DMRS corresponding to the PUCCH) may be the same as a set of antenna ports of the PUCCH.

Transmission of the PUCCH and transmission of the DMRS for the PUCCH may be indicated by one DCI format (or may be triggered). Mapping of the PUCCH to resource elements (resource element mapping) and/or mapping of the DMRS for the PUCCH to resource elements may be given by one PUCCH format. The PUCCH and the DMRS for the PUCCH may be collectively referred to as a PUCCH. Transmission of the PUCCH may mean transmission of the PUCCH and the DMRS for the PUCCH.

The PUCCH may be inferred from the DMRS for the PUCCH. In other words, a channel of the PUCCH may be inferred from the DMRS for the PUCCH.

The downlink physical channel may correspond to a set of resource elements for carrying information generated in a higher layer. The downlink physical channel may be a physical channel used in a downlink component carrier. The base station apparatus 3 may transmit the downlink physical channel. The terminal apparatus 1 may receive the downlink physical channel. In the radio communication system according to an aspect of the present embodiment, at least a part or all of the following downlink physical channels may be used.

Physical Broadcast Channel (PBCH)
Physical Downlink Control Channel (PDCCH)
Physical Downlink Shared Channel (PDSCH)

The PBCH may be used for transmitting a Master Information Block (MIB) and/or physical layer control information. The PBCH may be transmitted for conveying (delivering, transmitting) the MIB and/or the physical layer control information. The BCH may be mapped to the PBCH. The terminal apparatus 1 may receive the PBCH to which the MIB and/or the physical layer control information is mapped. The base station apparatus 3 may transmit the PBCH to which the MIB and/or the physical layer control information is mapped. The physical layer control information is also referred to as a PBCH payload, or a PBCH payload related to timing. The MIB may include one or multiple higher layer parameters.

The physical layer control information includes 8 bits. The physical layer control information may at least include a part or all of the following 0A to 0D.

0A) Radio frame bit
0B) Half radio frame (half system frame, half frame) bit
0C) SS/PBCH block index bit
0D) Subcarrier offset bit The radio frame bit is used for indicating a radio frame in which the PBCH is transmitted (radio frame including a slot in which the PBCH is transmitted). The radio frame bit includes 4 bits. The radio frame bit may include 4 bits of a 10-bit radio frame indicator. For example, the radio frame indicator may be at least used for identifying radio frames from index 0 to index 1023.

The half radio frame bit is used for indicating, out of the radio frame in which the PBCH is transmitted, which of the first five subframes or the last five subframes is used for transmission of the PBCH. Here, the half radio frame may include five subframes. The half radio frame may include the first five subframes out of the 10 subframes included in the radio frame. The half radio frame may include the last five subframes out of the 10 subframes included in the radio frame.

The SS/PBCH block index bit is used for indicating an SS/PBCH block index. The SS/PBCH block index bit includes 3 bits. The SS/PBCH block index bit may include 3 bits of a 6-bit SS/PBCH block index indicator. The SS/PBCH block index indicator may be at least used for identifying SS/PBCH blocks from index 0 to index 63.

The subcarrier offset bit is used for indicating a subcarrier offset. The subcarrier offset may be used for indicating a difference between the first subcarrier to which the PBCH is mapped and the first subcarrier to which the control resource set having an index of 0 is mapped.

The PDCCH may be used for transmitting Downlink Control Information (DCI). The PDCCH may be transmitted for conveying (delivering, transmitting) the downlink control information. The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may correspond to a DCI format. The downlink control information may be included in the DCI format. The downlink control information may be mapped to each field of the DCI format.

DCI format 0_0, DCI format 0_1, DCI format 1_0, and DCI format 1_1 are DCI formats including a set of fields different from each other. An uplink DCI format is a general term for DCI format 0_0 and DCI format 0_1. A downlink DCI format is a general term for DCI format 1_0 and DCI format 1_1.

DCI format 0_0 is at least used for scheduling the PUSCH of a certain cell (or mapped to a certain cell). DCI format 0_0 at least includes a part or all of fields from 1A to 1E.

1A) DCI format identification field (Identifier field for DCI formats)
1B) Frequency domain resource allocation field (Frequency domain resource assignment field)
1C) Time domain resource assignment field 1D) Frequency hopping flag field 1E) Modulation and Coding Scheme (MCS) field The DCI format identification field may indicate whether the DCI format including the DCI format identification field is an uplink DCI format or a downlink DCI format. The DCI format identification field included in DCI format 0_0 may indicate 0 (or may indicate that DCI format 0_0 is an uplink DCI format).

The frequency domain resource assignment field included in DCI format 0_0 may be at least used for indicating allocation of frequency resources for the PUSCH.

The time domain resource assignment field included in DCI format 00 may be at least used for indicating allocation time resources for the PUSCH.

The frequency hopping flag field may be at least used for indicating whether or not frequency hopping is applied to the PUSCH.

The MCS field included in DCI format 0_0 may be at least used for indicating a part or all of a modulation scheme for the PUSCH and/or a target coding rate. The target coding rate may be a target coding rate for the transport block of the PUSCH. The size of the transport block (Transport Block Size (TBS)) of the PUSCH may be given based at least on a part or all of the target coding rate and the modulation scheme for the PUSCH.

DCI format 0_0 need not include a field used for a CSI request. In other words, CSI need not be requested using DCI format 0_0.

DCI format 0_0 need not include a carrier indicator field. In other words, the uplink component carrier to which the PUSCH scheduled using DCI format 0_0 is mapped may be the same as the uplink component carrier to which the PDCCH including DCI format 0_0 is mapped.

DCI format 0_0 need not include the BWP field. In other words, the uplink BWP to which the PUSCH scheduled using DCI format 0_0 is mapped may be the same as the uplink BWP to which the PDCCH including DCI format 0_0 is mapped.

DCI format 0_1 is at least used for scheduling of the PUSCH of a certain cell (mapped to a certain cell). DCI format 0_1 at least includes a part or all of fields of 2A to 2H.

2A) DCI format identification field

2B) Frequency domain resource assignment field

2C) Uplink time domain resource assignment field

2D) Frequency hopping flag field

2E) MCS field

2F) CSI request field

2G) BWP field

2H) Carrier indicator field

The DCI format identification field included in DCI format 0_1 may indicate 0 (or may indicate that DCI format 0_1 is an uplink DCI format).

The frequency domain resource assignment field included in DCI format 0_1 may be at least used for indicating allocation of frequency resources for the PUSCH.

The time domain resource assignment field included in DCI format 0_1 may be at least used for indicating allocation time resources for the PUSCH.

The MCS field included in DCI format 0_1 may be at least used for indicating a part or all of a modulation scheme for the PUSCH and/or a target coding rate.

In a case that the BWP field is included in DCI format 0_1, the BWP field may be used for indicating an uplink BWP to which the PUSCH is mapped. In a case that the BWP field is not included in DCI format 0_1, the uplink BWP to which the PUSCH is mapped may be the same as the uplink BWP to which the PDCCH including DCI format 0_1 used for scheduling of the PUSCH is mapped. In a case that the number of uplink BWPs configured for the terminal apparatus 1 in a certain uplink component carrier is two or greater, the number of bits of the BWP field included in DCI format 0_1 used for scheduling of the PUSCH mapped to the certain uplink component carrier may be 1 bit or more. In a case that the number of uplink BWPs configured for the terminal apparatus 1 in a certain uplink component carrier is one, the number of bits of the BWP field included in DCI format 0_1 used for scheduling of the PUSCH mapped to the certain uplink component carrier may be 0 bits (or the BWP field need not be included in DCI format 0_1 used for scheduling of the PUSCH mapped to the certain uplink component carrier).

The CSI request field is at least used for indicating the report of the CSI.

In a case that the carrier indicator field is included in DCI format 0_1, the carrier indicator field may be used for indicating the uplink component carrier to which the PUSCH is mapped. In a case that the carrier indicator field is not included in DCI format 0_1, the uplink component carrier to which the PUSCH is mapped may be the same as the uplink component carrier to which the PDCCH including DCI format 0_1 used for scheduling of the PUSCH is mapped. In a case that the number of uplink component carriers configured for the terminal apparatus 1 in a certain serving cell group is two or greater (case that uplink carrier aggregation is operated in a certain serving cell group), the number of bits of the carrier indicator field included in DCI format 0_1 used for scheduling of the PUSCH mapped to the certain serving cell group may be 1 bit or more (for example, 3 bits). In a case that the number of uplink component carriers configured for the terminal apparatus 1 in a certain serving cell group is one (case that uplink carrier aggregation is not operated in a certain serving cell group), the number of bits of the carrier indicator field included in DCI format 0_1 used for scheduling of the PUSCH mapped to the certain serving cell group may be 0 bits (or the carrier indicator field need not be included in DCI format 0_1 used for scheduling of the PUSCH mapped to the certain serving cell group).

DCI format 1_0 is at least used for scheduling of the PDSCH of a certain cell (mapped to a certain cell). DCI format 1_0 at least includes a part or all of 3A to 3F.

3A) DCI format identification field

3B) Frequency domain resource assignment field

3C) Time domain resource assignment field

3D) MCS field

3E) PDSCH_HARQ feedback timing indication field (PDSCH to HARQ feedback timing indicator field)

3F) PUCCH resource indication field (PUCCH resource indicator field)

The DCI format identification field included in DCI format 1_0 may indicate 1 (or may indicate that DCI format 1_0 is a downlink DCI format).

The frequency domain resource assignment field included in DCI format 1_0 may be at least used for indicating allocation of frequency resources for the PDSCH.

The time domain resource assignment field included in DCI format 10 may be at least used for indicating allocation of time resources for the PDSCH.

The MCS field included in DCI format 1_0 may be at least used for indicating a part or all of a modulation scheme for the PDSCH and/or a target coding rate. The target coding rate may be a target coding rate for the transport block of the PDSCH. The size of the transport block (Transport Block Size (TBS)) of the PDSCH may be given based at least on a part or all of the target coding rate and the modulation scheme for the PDSCH.

The PDSCH_HARQ feedback timing indication field may be at least used for indicating an offset from the slot including the last OFDM symbol of the PDSCH to the slot including the first OFDM symbol of the PUCCH.

The PUCCH resource indication field may be a field indicating an index of one of one or multiple PUCCH resources included in a PUCCH resource set. The PUCCH resource set may include one or multiple PUCCH resources.

DCI format 1_0 need not include the carrier indicator field. In other words, the downlink component carrier to which the PDSCH scheduled using DCI format 1_0 is mapped may be the same as the downlink component carrier to which the PDCCH including DCI format 1_0 is mapped.

DCI format 1_0 need not include the BWP field. In other words, the downlink BWP to which the PDSCH scheduled using DCI format 1_0 is mapped may be the same as the downlink BWP to which the PDCCH including DCI format 1_0 is mapped.

DCI format 1_1 is at least used for scheduling the PDSCH of a certain cell (or mapped to a certain cell). DCI format 1_1 at least includes a part or all of 4A to 4I.

4A) DCI format identification field
4B) Frequency domain resource assignment field
4C) Time domain resource assignment field
4E) MCS field
4F) PDSCH_HARQ feedback timing indication field
4G) PUCCH resource indicator field
4H) BWP field
4I) Carrier indicator field The DCI format identification field included in DCI format 1_1 may indicate 1 (or may indicate that DCI format 1_1 is a downlink DCI format).

The frequency domain resource assignment field included in DCI format 1_1 may be at least used for indicating allocation of frequency resources for the PDSCH.

The time domain resource assignment field included in DCI format 1_1 may be at least used for indicating allocation of time resources for the PDSCH.

The MCS field included in DCI format 1_1 may be at least used for indicating a part or all of the modulation scheme for the PDSCH and/or the target coding rate.

In a case that the PDSCH_HARQ feedback timing indication field is included in DCI format 1_1, the PDSCH_HARQ feedback timing indication field may be at least used for indicating an offset from the slot including the last OFDM symbol of the PDSCH to the slot including the first OFDM symbol of the PUCCH. In a case that the PDSCH_HARQ feedback timing indication field is not included in DCI format 1_1, an offset from the slot including the last OFDM symbol of the PDSCH to the slot including the first OFDM symbol of the PUCCH may be identified by a higher layer parameter.

The PUCCH resource indication field may be a field indicating an index of one of one or multiple PUCCH resources included in a PUCCH resource set.

In a case that the BWP field is included in DCI format 1_1, the BWP field may be used for indicating the downlink BWP to which the PDSCH is mapped. In a case that the BWP field is not included in DCI format 1_1, the downlink BWP to which the PDSCH is mapped may be the same as the downlink BWP to which the PDCCH including DCI format 1_1 used for scheduling of the PDSCH is mapped. In a case that the number of downlink BWPs configured for the terminal apparatus 1 in a certain downlink component carrier is two or greater, the number of bits of the BWP field included in DCI format 1_1 used for scheduling of the PDSCH mapped to the certain downlink component carrier may be 1 bit or more. In a case that the number of downlink BWPs configured for the terminal apparatus 1 in a certain downlink component carrier is one, the number of bits of the BWP field included in DCI format 1_1 used for scheduling of the PDSCH mapped to the certain downlink component carrier may be 0 bits (or the BWP field need not be included in DCI format 1_1 used for scheduling of the PDSCH mapped to the certain downlink component carrier).

In a case that the carrier indicator field is included in DCI format 1_1, the carrier indicator field may be used for indicating the downlink component carrier to which the PDSCH is mapped. In a case that the carrier indicator field is not included in DCI format 1_1, the downlink component carrier to which the PDSCH is mapped may be the same as the downlink component carrier to which the PDCCH including DCI format 1_1 used for scheduling of the PDSCH is mapped. In a case that the number of downlink component carriers configured for the terminal apparatus 1 in a certain serving cell group is two or greater (case that downlink carrier aggregation is operated in a certain serving cell group), the number of bits of the carrier indicator field included in DCI format 1_1 used for scheduling of the PDSCH mapped to the certain serving cell group may be 1 bit or more (for example, 3 bits). In a case that the number of downlink component carriers configured for the terminal apparatus 1 in a certain serving cell group is one (case that downlink carrier aggregation is not operated in a certain serving cell group), the number of bits of the carrier indicator field included in DCI format 1_1 used for scheduling of the PDSCH mapped to the certain serving cell group may be 0 bits (or the carrier indicator field need not be included in DCI format 1_1 used for scheduling of the PDSCH mapped to the certain serving cell group).

The PDSCH may be used for transmitting the transport block. The PDSCH may be used for transmitting the transport block corresponding to the DL-SCH. The PDSCH may be used for conveying the transport block. The PDSCH may be used for conveying the transport block corresponding to the DL-SCH. The transport block may be mapped to the PDSCH. The transport block corresponding to the DL-SCH may be mapped to the PDSCH. The base station apparatus 3 may transmit the PDSCH. The terminal apparatus 1 may receive the PDSCH.

The downlink physical signal may correspond to a set of resource elements. The downlink physical signal need not carry information generated in a higher layer. The downlink physical signal may be a physical signal used in the downlink component carrier. The downlink physical signal may be transmitted by the base station apparatus 3. The downlink physical signal may be transmitted by the terminal apparatus 1. In the radio communication system according to an aspect of the present embodiment, at least a part or all of the following downlink physical signals may be used.

Synchronization Signal (SS)
DownLink DeModulation Reference Signal (DL DMRS)
Channel State Information-Reference Signal (CSI-RS)
DownLink Phase Tracking Reference Signal (DL PTRS)

The synchronization signal may be at least used for the terminal apparatus 1 to establish synchronization of the frequency domain and/or the time domain in the downlink. The synchronization signal is a general term for the Primary Synchronization Signal (PSS) and the Secondary Synchronization Signal (SSS).

Figure 7:
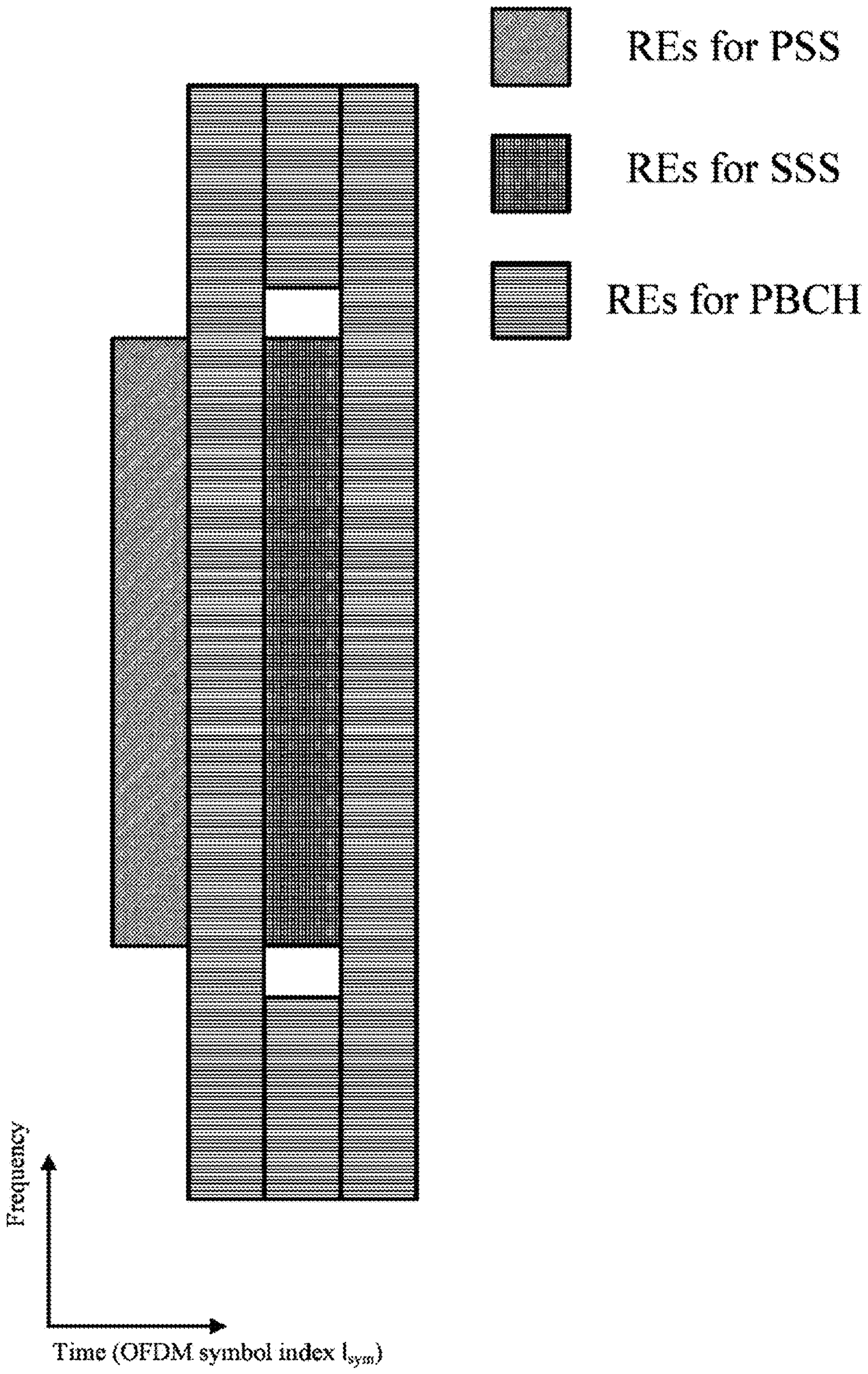
FIG. 7 is a diagram illustrating a configuration example of SS/PBCH blocks according to an aspect of the present embodiment.

FIG. 7 is a diagram illustrating a configuration example of the SS/PBCH block according to an aspect of the present embodiment. In FIG. 7, the horizontal axis corresponds to a time axis (OFDM symbol index $1_{sym}$), and the vertical axis represents the frequency domain. The block hatched with diagonal lines represents a set of resource elements for the PSS. The block hatched with grid lines represents a set of resource elements for the SSS. The block hatched with horizontal lines represents a set of resource elements for the PBCH and the DMRS for the PBCH (DMRS related to the PBCH, DMRS included in the PBCH, DMRS corresponding to the PBCH).

As illustrated in FIG. 7, the SS/PBCH block includes the PSS, the SSS, and the PBCH. The SS/PBCH block includes four continuous OFDM symbols. The SS/PBCH block includes 240 subcarriers. The PSS is mapped to the 57th to 183rd subcarriers in the first OFDM symbol. The SSS is mapped to the 57th to 183rd subcarriers in the third OFDM symbol. Zero may be set to the 1st to 56th subcarriers of the first OFDM symbol. Zero may be set to the 184th to 240th subcarriers of the first OFDM symbol. Zero may be set to the 49th to 56th subcarriers of the third OFDM symbol. Zero may be set to the 184th to 192nd subcarriers of the third OFDM symbol. The PBCH is mapped to subcarriers which are the 1 st to 240th subcarriers of the second OFDM symbol and to which the DMRS for the PBCH is not mapped. The PBCH is mapped to subcarriers which are the 1st to 48th subcarriers of the third OFDM symbol and to which the DMRS for the PBCH is not mapped. The PBCH is mapped to subcarriers which are the 193rd to 240th subcarriers of the third OFDM symbol and to which the DMRS for the PBCH is not mapped. The PBCH is mapped to subcarriers which are the 1st to 240th subcarriers of the fourth OFDM symbol and to which the DMRS for the PBCH is not mapped.

The PSS, the SSS, the PBCH, and the antenna port of the DMRS for the PBCH may be the same.

The PBCH on which the symbol of the PBCH in a certain antenna port is conveyed may be inferred by the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS related to the PDSCH, DMRS included in the PDSCH, DMRS corresponding to the PDSCH) may be given based on a set of antenna ports for the PDSCH. In other words, the set of antenna ports of the DMRS for the PDSCH may be the same as the set of antenna ports for the PDSCH.

Transmission of the PDSCH and transmission of the DMRS for the PDSCH may be indicated (or may be scheduled) by one DCI format. The PDSCH and the DMRS for the PDSCH may be collectively referred to as a PDSCH. Transmission of the PDSCH may be transmission of the PDSCH and the DMRS for the PDSCH.

The PDSCH may be inferred from the DMRS for the PDSCH. In other words, a channel of the PDSCH may be inferred from the DMRS for the PDSCH. In a case that a set of resource elements in which the symbol of a certain PDSCH and a set of resource elements in which the symbol of the DMRS for the certain PDSCH is conveyed are included in the same Precoding Resource Group (PRG), the PDSCH on which the symbol of the PDSCH in a certain antenna port is conveyed may be inferred by the DMRS for the PDSCH.

The antenna port of the DMRS for the PDCCH (DMRS related to the PDCCH, DMRS included in the PDCCH, DMRS corresponding to the PDCCH) may be the same as the antenna port for the PDCCH.

The PDCCH may be inferred from the DMRS for the PDCCH. In other words, a channel of the PDCCH may be inferred from the DMRS for the PDCCH. In a case that the same precoder is applied to a set of resource elements in which the symbol of a certain PDCCH is conveyed and a set of resource elements in which the symbol of the DMRS for the certain PDCCH is conveyed (assumed to be applied), the PDCCH on which the symbol of the PDCCH in a certain antenna port is conveyed may be inferred by the DMRS for the PDCCH.

A Broadcast CHannel (BCH), an Uplink-Shared CHannel (UL-SCH), and a Downlink-Shared CHannel (DL-SCH) are transport channels. A channel used in the MAC layer is referred to as a transport channel. A unit of the transport channel used in the MAC layer is also referred to as a transport block (TB) or a MAC Protocol Data Unit (PDU). Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword and modulation processing is performed for each codeword.

For each serving cell, one UL-SCH and one DL-SCH may be given. The BCH may be given to the PCell. The BCH need not be given to the PSCell and the SCell.

A Broadcast Control CHannel (BCCH), a Common Control CHannel (CCCH), and a Dedicated Control CHannel (DCCH) are logical channels. For example, the BCCH is a channel of the RRC layer used for transmitting the MIB or system information. A Common Control CHannel (CCCH) may be used for transmitting a common RRC message in multiple terminal apparatuses 1. Here, the CCCH may be, for example, used for the terminal apparatus 1 that is not in a state of RRC connection. A Dedicated Control CHannel (DCCH) may be at least used for transmitting a dedicated RRC message to the terminal apparatus 1. Here, the DCCH may be, for example, used for the terminal apparatus 1 that is in a state of RRC connection.

The RRC message includes one or multiple RRC parameters (information elements). For example, the RRC message may include the MIB. The RRC message may include the system information. The RRC message may include a message corresponding to the CCCH. The RRC message may include a message corresponding to the DCCH. The RRC message including a message corresponding to the DCCH is also referred to as a specific RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

The higher layer parameter is a parameter included in the RRC message or a Medium Access Control Element (MAC CE). In other words, the higher layer parameter is a general term for parameters included in an MIB, system information, a message corresponding to the CCCH, a message corresponding to the DCCH, and the MAC CE. Parameters included in MAC CE are transmitted by MAC Control Element (CE) commands.

Procedures performed by the terminal apparatus 1 at least include a part or all of the following 5A to 5C.

5A) Cell search

5B) Random access

5C) Data communication

The cell search is a procedure in which synchronization with a certain cell related to the time domain and the frequency domain is performed by the terminal apparatus 1, which is used for detecting a physical cell identity (physical cell ID). In other words, the terminal apparatus 1 may perform synchronization with a certain cell in the time domain and the frequency domain by means of cell search, and detect a physical cell ID.

A sequence of the PSS is given based at least on the physical cell ID. A sequence of the SSS is given based at least on the physical cell ID.

An SS/PBCH block candidate indicates a resource allowed to (capable of, scheduled to, configured to, defined to, having a possibility of) transmit the SS/PBCH block.

A set of SS/PBCH block candidates in a certain half radio frame is also referred to as an SS burst set. The SS burst set is also referred to as a transmission window, an SS transmission window, or a Discovery Reference Signal transmission window (DRS transmission window). The SS burst set is a general term at least including a first SS burst set and a second SS burst set.

The base station apparatus 3 transmits SS/PBCH blocks with one or multiple indexes in a prescribed period. The terminal apparatus 1 may detect at least one SS/PBCH block out of the SS/PBCH blocks with one or multiple indexes, and attempt decoding of the PBCH included in the SS/PBCH block.

The random access is a procedure at least including a part or all of a message 1, a message 2, a message 3, and a message 4.

The message 1 is a procedure in which the PRACH is transmitted by the terminal apparatus 1. The terminal apparatus 1 transmits the PRACH in one PRACH occasion selected out of one or multiple PRACH occasions, based at least on the index of the SS/PBCH block candidate detected based on cell search. Each PRACH occasion is defined based on at least resources in the time domain and the frequency domain.

The terminal apparatus 1 transmits one random access preamble selected out of the PRACH occasion corresponding to the index of the SS/PBCH block candidate in which the SS/PBCH block is detected.

The message 2 is a procedure in which detection of DCI format 1_0 with a Cyclic Redundancy Check (CRC) scrambled with a Random Access-Radio Network Temporary Identifier (RA-RNTI) by the terminal apparatus 1 is attempted. The terminal apparatus 1 attempts detection of the PDCCH including the DCI format in a control resource set given based on the MIB included in the PBCH included in the SS/PBCH block detected based on cell search, and resources indicated based on a configuration of a search space set. The message 2 is also referred to as the random access response.

The message 3 is a procedure in which the PUSCH scheduled using a random access response grant included in DCI format 1_0 detected through the procedure of the message 2 is transmitted. Here, the random access response grant is indicated by the MAC CE included in the PDSCH scheduled using DCI format 1_0.

The PUSCH scheduled based on the random access response grant is one of a message 3 PUSCH or a PUSCH. The message 3 PUSCH includes a contention resolution identifier (contention resolution ID) MAC CE. The contention resolution ID MAC CE includes a contention resolution ID.

Retransmission of the message 3 PUSCH is scheduled using DCI format 0_0 with a CRC scrambled based on a Temporary Cell-Radio Network Temporary Identifier (TC-RNTI).

The message 4 is a procedure in which detection of DCI format 1_0 with a CRC scrambled based on one of a Cell-Radio Network Temporary Identifier (C-RNTI) or a TC-RNTI is attempted. The terminal apparatus 1 receives the PDSCH scheduled based on DCI format 1_0. The PDSCH may include a contention resolution ID.

Data communication is a general term for downlink communication and uplink communication.

In data communication, the terminal apparatus 1 attempts detection of the PDCCH (monitors the PDCCH) in a control resource set and resources identified based on a search space set.

The control resource set is a set of resources including a certain number of resource blocks and a certain number of OFDM symbols. In the frequency domain, the control resource set may include continuous resources (non-interleaved mapping), or may include distributed resources (interleaver mapping).

A set of resource blocks constituting the control resource set may be indicated by a higher layer parameter. The number of OFDM symbols constituting the control resource set may be indicated by a higher layer parameter.

The terminal apparatus 1 attempts detection of the PDCCH in a search space set. Here, an attempt to detect the PDCCH in the search space set may be an attempt to detect a candidate of the PDCCH in the search space set, may be an attempt to detect a DCI format in the search space set, may be an attempt to detect the PDCCH in the control resource set, may be an attempt to detect a candidate of the PDCCH in the control resource set, or may be an attempt to detect a DCI format in the control resource set.

The search space set is defined as a set of candidates of the PDCCH. The search space set may be a Common Search Space (CSS) set, or may be a UE-specific Search Space (USS) set. The terminal apparatus 1 attempts detection of candidates of the PDCCH in a part or all of a Type 0 PDCCH common search space set, a Type 0a PDCCH common search space set, a Type 1 PDCCH common search space set, a Type 2 PDCCH common search space set, a Type 3 PDCCH common search space set, and/or a UE-specific PDCCH search space set (UE-specific search space set).

The Type 0 PDCCH common search space set may be used as a common search space set having an index of 0. The Type 0 PDCCH common search space set may be a common search space set having an index of 0.

The CSS set is a general term for the Type 0 PDCCH common search space set, the Type 0a PDCCH common search space set, the Type 1 PDCCH common search space set, the Type 2 PDCCH common search space set, and the Type 3 PDCCH common search space set. The USS set is also referred to as a UE-specific PDCCH search space set.

A certain search space set is related to (included in, corresponds to) a certain control resource set. The index of the control resource set related to the search space set may be indicated by a higher layer parameter.

For a certain search space set, a part or all of 6A to 6C may be indicated by at least a higher layer parameter.

6A) Monitoring interval of the PDCCH (PDCCH monitoring periodicity)

6B) Monitoring pattern of the PDCCH in a slot (PDCCH monitoring pattern within a slot)

6C) Monitoring offset of the PDCCH (PDCCH monitoring offset)

The monitoring occasion of a certain search space set may correspond to the OFDM symbol to which the first OFDM symbol of the control resource set related to the certain search space set is mapped. The monitoring occasion of a certain search space set may correspond to a resource of the control resource set starting from the first OFDM symbol of the control resource set related to the certain search space set. The monitoring occasion of the search space set is given based at least on a part or all of the monitoring interval of the PDCCH, the monitoring pattern of the PDCCH in a slot, and the monitoring offset of the PDCCH.

Figure 8:
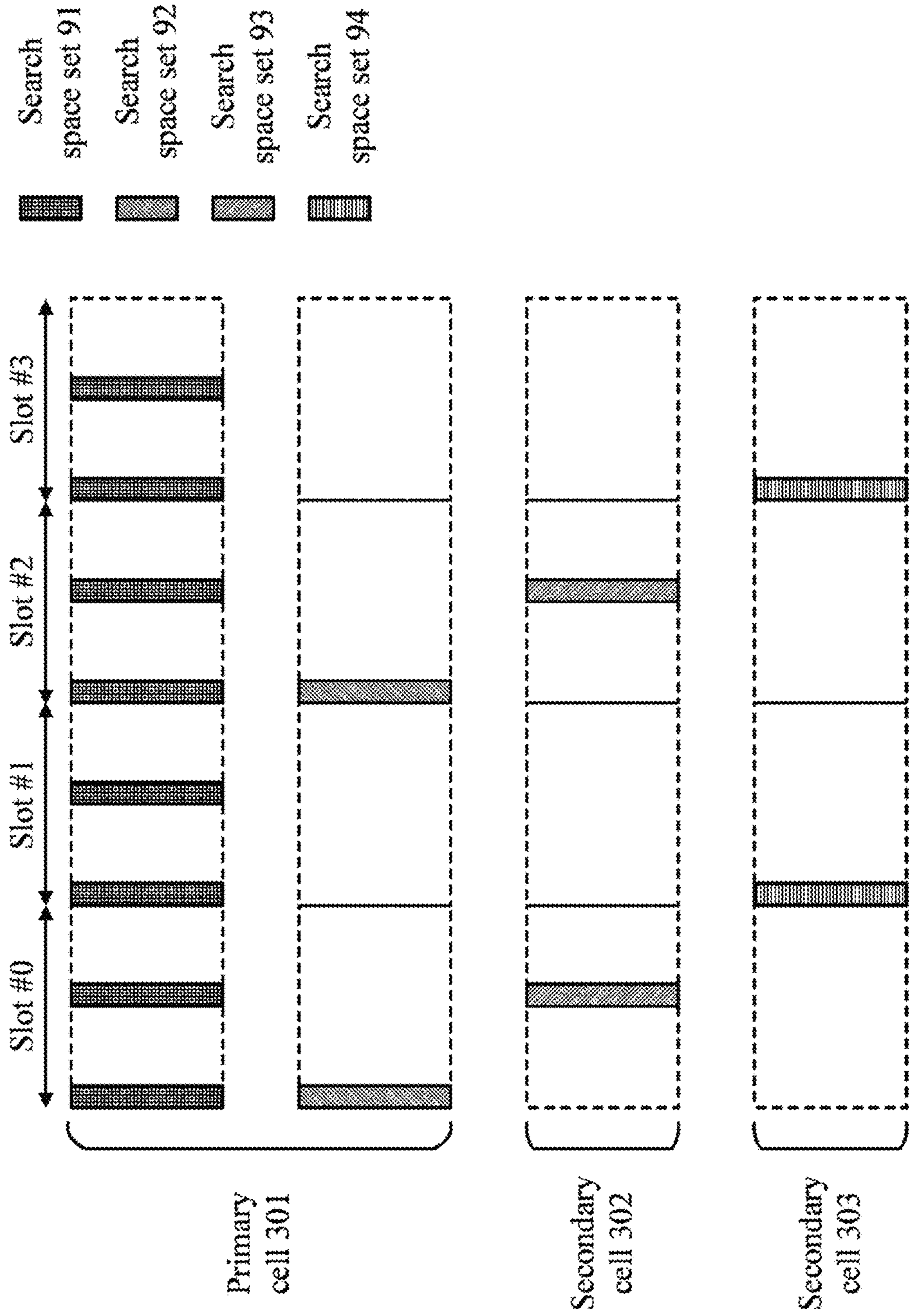
FIG. 8 is a diagram illustrating an example of monitoring occasions for search space sets according to an aspect of the present embodiment.

FIG. 8 is a diagram illustrating an example of the monitoring occasion for the search space set according to an aspect of the present embodiment. In FIG. 8, a search space set 91 and a search space set 92 are configured in a primary cell 301, a search space set 93 is configured in a secondary cell 302, and a search space set 94 is configured in a secondary cell 303.

In FIG. 8, each block hatched with grid lines represents the search space set 91, each block hatched with lines rising diagonally up and to the right represents the search space set 92, each block hatched with lines rising diagonally up and to the left represents the search space set 93, and each block hatched with horizontal lines represents the search space set 94.

The monitoring periodicity of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0]. In other words, the monitoring occasion for the search space set 91 corresponds to the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1, 0, 0, 0, 0, 0, 0, 0, 0, 0, 0, 0, 0]. In other words, the monitoring occasion for the search space set 92 corresponds to the first OFDM symbol (OFDM symbol #0) in each of the even-numbered slots.

The monitoring periodicity of the search space set 93 is set to two slots, the monitoring offset of the search space set 93 is set to zero slots, and the monitoring pattern of the search space set 93 is set to [0, 0, 0, 0, 0, 0, 0, 1, 0, 0, 0, 0, 0]. In other words, the monitoring occasion for the search space set 93 corresponds to the eighth OFDM symbol (OFDM symbol #7) in each of the even-numbered slots.

The monitoring periodicity of the search space set 94 is set to two slots, the monitoring offset of the search space set 94 is set to one slot, and the monitoring pattern of the search space set 94 is set to [1, 0, 0, 0, 0, 0, 0, 0, 0, 0, 0, 0, 0]. In other words, the monitoring occasion for the search space set 94 corresponds to the first OFDM symbol (OFDM symbol #0) in each of the odd-numbered slots.

The Type 0 PDCCH common search space set may be at least used for the DCI format with a Cyclic Redundancy Check (CRC) sequence scrambled with a System Information-Radio Network Temporary Identifier (SI-RNTI).

The Type 0a PDCCH common search space set may be at least used for the DCI format with a Cyclic Redundancy Check (CRC) sequence scrambled with a System Information-Radio Network Temporary Identifier (SI-RNTI).

The Type 1 PDCCH common search space set may be at least used for the DCI format with a CRC sequence scrambled with a Random Access-Radio Network Temporary Identifier (RA-RNTI) and/or a CRC sequence scrambled with a Temporary Cell-Radio Network Temporary Identifier (TC-RNTI).

The Type 2 PDCCH common search space set may be used for the DCI format with a CRC sequence scrambled with a Paging-Radio Network Temporary Identifier (P-RNTI).

The Type 3 PDCCH common search space set may be used for the DCI format with a CRC sequence scrambled with a CELL-RADIO NETWORK TEMPORARY IDENTIFIER (C-RNTI).

The UE-specific PDCCH search space set may be at least used for the DCI format with a CRC sequence scrambled with a C-RNTI.

In downlink communication, the terminal apparatus 1 detects a downlink DCI format. The detected downlink DCI format is at least used for resource allocation of the PDSCH. The detected downlink DCI format is also referred to as downlink allocation (downlink assignment). The terminal apparatus 1 attempts reception of the PDSCH. Based on the PUCCH resource indicated based on the detected downlink DCI format, the HARQ-ACK corresponding to the PDSCH (HARQ-ACK corresponding to the transport block included in the PDSCH) is reported to the base station apparatus 3.

In uplink communication, the terminal apparatus 1 detects an uplink DCI format. The detected DCI format is at least used for resource allocation of the PUSCH. The detected uplink DCI format is also referred to as an uplink grant. The terminal apparatus 1 performs transmission of the PUSCH.

In the configured scheduling (configured grant), the uplink grant for scheduling the PUSCH is configured for each transmission cycle of the PUSCH. In a case that the PUSCH is scheduled using the uplink DCI format, some or all of the pieces of information indicated by the uplink DCI format may be indicated by the uplink grant configured in a case of the configured scheduling.

Multiple SS/PBCH block candidates may be allocated in a half radio frame. The allocated multiple SS/PBCH block candidates may be assigned candidate indexes in ascending order on the time axis. For example, in a case that $N_{SSB}$ SS/PBCH block candidates are allocated in the half radio frame, the value of the candidate index may range from 0 to $N_{SSB}-1$.

For example, frequency resources for the $N_{SSB}$ SS/PBCH block candidates in a half radio frame may be the same.

Each of the $N_{SSB}$ SS/PBCH block candidates in the half radio frame may assigned an SS/PBCH block index. For example, the SS/PBCH block index may equal the candidate index. For example, the SS/PBCH block index may be determined by the remainder of a division of the candidate index by the value Q. Here, the value Q may be indicated by a higher layer parameter.

The base station apparatus 3 may notify the terminal apparatus 1 of bit map information. The terminal apparatus 1 may determine the association between the SS/PBCH block index and the PRACH occasion based on the bitmap information. The bitmap information may be included in the higher layer parameter.

For example, the bitmap information may be used to indicate a set of SS/PBCH blocks transmitted by the base station apparatus 3. Based on the bitmap information, the terminal apparatus 1 may recognize a pool of SS/PBCH block indexes. The pool of SS/PBCH block indexes is also referred to as an index pool. For example, in a case that the bit map information includes 8 bits, the first bit corresponds to an SS/PBCH block index 0, the second bit corresponds to an SS/PBCH block index 1, and the X-th bit may correspond to an SS/PBCH block index X−1. In a case that the X-th bit is set to 1, the terminal apparatus 1 may include the SS/PBCH block index X−1 in the index pool. In a case that the X-th bit is set to 0, the terminal apparatus 1 need not include the SS/PBCH block index X−1 in the index pool.

The number of SS/PBCH block indexes included in the index pool is also referred to as $N^{SSB}_{TX}$.

A determination procedure for the relationship between the SS/PBCH block index and the PRACH occasion may be a procedure for mapping the SS/PBCH block index for each of multiple PRACH occasions in an association period. For example, the association period may be any of 10 ms, 20 ms, 40 ms, 80 ms, or 160 ms.

Figure 9:
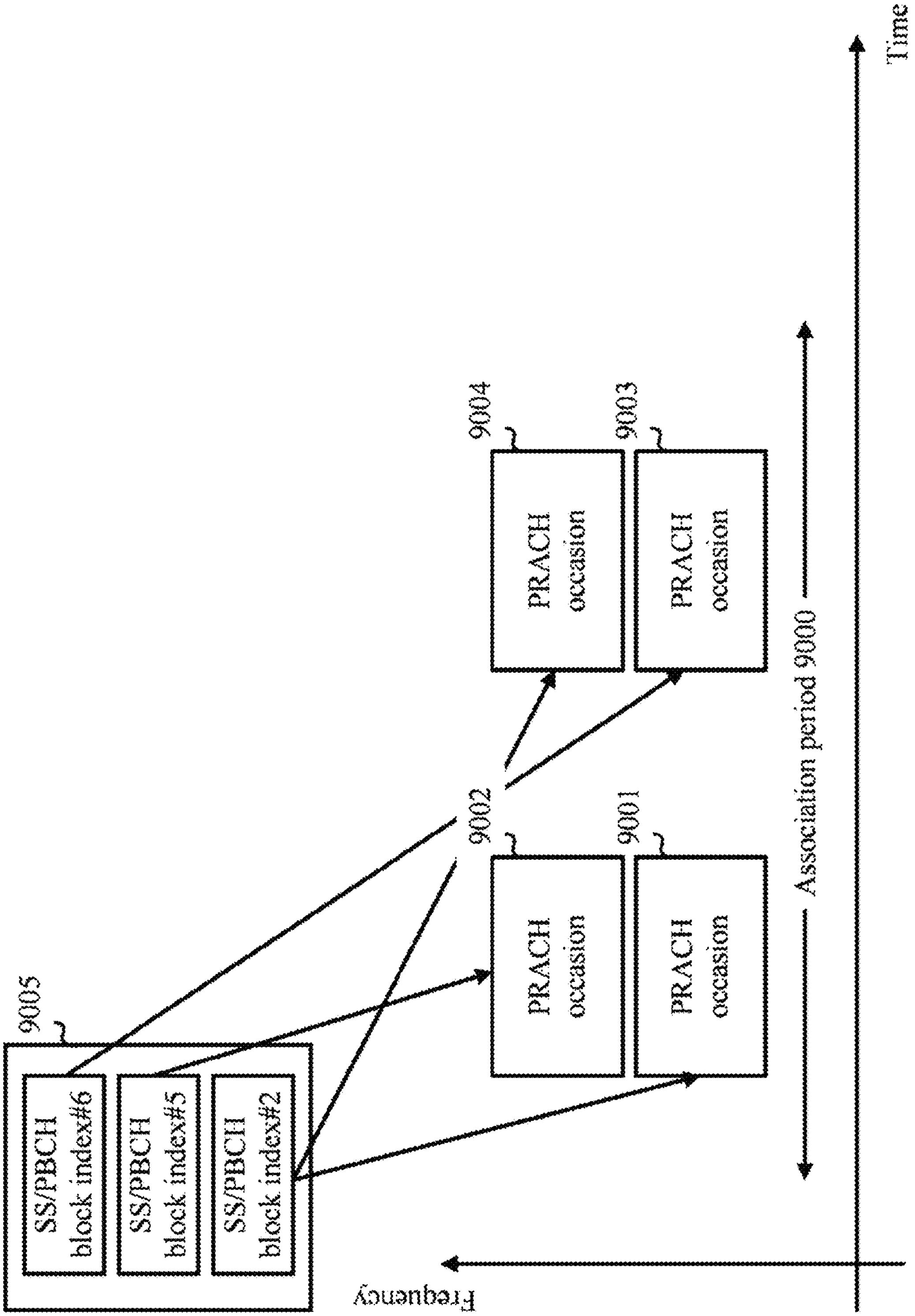
FIG. 9 is a diagram illustrating an example of a determination procedure for a relationship between SS/PBCH block indexes and PRACH occasions according to an aspect of the present embodiment.

FIG. 9 is a diagram illustrating a configuration example of the determination procedure for the relationship between the SS/PBCH block index and the PRACH occasion according to an aspect of the present embodiment. In FIG. 9, 9000 denotes an association period. Each of 9001 to 9004 denotes one PRACH occasion in the association period 9000, 9005 denotes an index pool. In FIG. 9, the index pool 9005 includes SS/PBCH block indexes #2, #5, and #6V.

In the example illustrated in FIG. 9, the SS/PBCH block index #2 is associated with the PRACH occasions 9001 and 9004, the SS/PBCH block index #5 is associated with the PRACH occasion 9002, and the SS/PBCH block index #6 is associated with the PRACH occasion 9003.

As illustrated in FIG. 9, the SS/PBCH block indexes included in the index pool may be cyclically associated with PRACH occasions. The ordering of the PRACH occasions may be performed by ordering the PRACH occasions in ascending order in the frequency domain and then ordering the PRACH occasions (Frequency-first time-second).

For the determination procedure for the relationship between the SS/PBCH block index and the PRACH occasion, some or all of N, R, and $N_{total}$ may be notified at least to the terminal apparatus 1. N is a parameter indicating the number of SS/PBCH blocks associated with one PRACH occasion. R is a parameter indicating the number of preambles for Contention-Based Random-Access (CBRA) allocated to one SS/PBCH block index, among the random access preambles on one PRACH occasion. Now is a parameter indicating the sum of, among the random access preambles on one PRACH occasion, the number of preambles for CBRA and the number of preambles for Contention-Free Random-Access (CFRA).

FIG. 9 is an example for N of 1.

Figure 10:
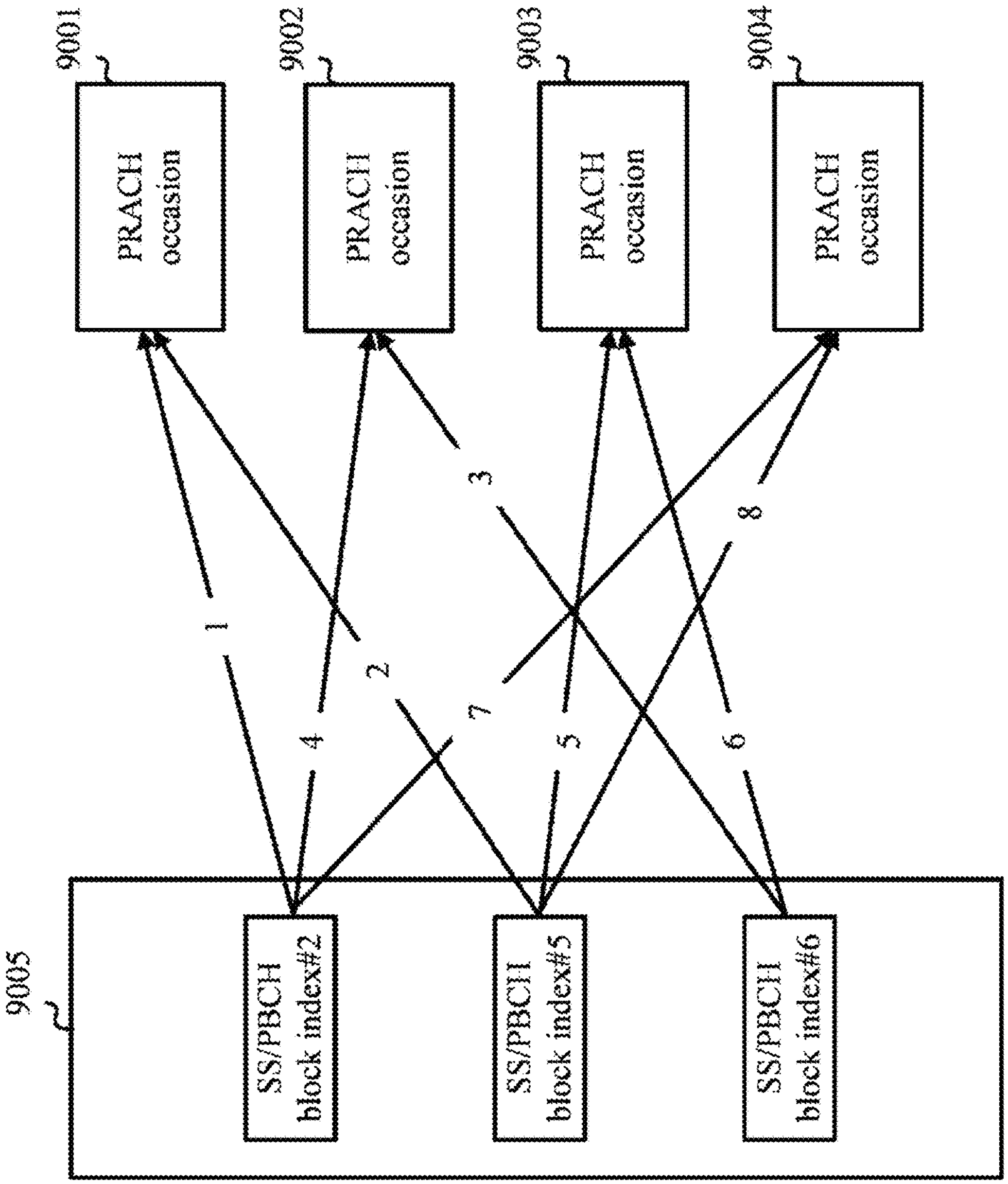
FIG. 10 is a diagram illustrating an example of a determination procedure for the relationship between the SS/PBCH block indexes and the PRACH occasions according to an aspect of the present embodiment.

FIG. 10 is a diagram illustrating an example of the determination procedure for the SS/PBCH block index and the PRACH occasion according to an aspect of the present embodiment. FIG. 10 is an example for N of 2. In FIG. 10, the SS/PBCH block indexes #2 and #5 are associated with the PRACH occasion 9001, the SS/PBCH block indexes #6 and #2 are associated with the PRACH occasion 9002, the SS/PBCH block indexes #5 and #6 are associated with the PRACH occasion 9003, and the SS/PBCH block indexes #2 and #5 are associated with the PRACH occasion 9004.

As illustrated in FIG. 10, the terminal apparatus 1 may cyclically associate the SS/PBCH block index with one or more PRACH occasions in the association period. The method for cyclic association may be provided based on some or all of steps 1 to 4 described below.

Step 1 may involve an operation of arranging the SS/PBCH block indexes included in the index pool 9005 in ascending order.

Note that in step 1, an internal index $I_V$ may be added to the SS/PBCH block indexes arranged in ascending order.

Step 2 may include an operation of selecting the first SS/PBCH block index from the index pool 9005. For N greater than 1, step 2 may include an operation of selecting the first to N-th SS/PBCH block indexes. Here, the SS/PBCH block index is cyclically selected. Here, the first SS/PBCH block index is the SS/PBCH block index next to the SS/PBCH block index selected as the N-th in the last previous operation in step 2. In a case that the operation in the current step 2 is the first operation, the first SS/PBCH block index is the minimum SS/PBCH block index included in the index pool 9005. In the operation in step 2, the SS/PBCH block index selection is cyclically selected. For example, in a case that the SS/PBCH block index #6 is selected as the N-th in the last previous operation in step 2, the SS/PBCH block index next to the SS/PBCH block index selected as the N-th is the SS/PBCH block index #2. In a case that the SS/PBCH block index #5 is selected as the N-th in the last previous operation in step 2, the SS/PBCH block index next to the SS/PBCH block index selected as the N-th is the SS/PBCH block index #6. Furthermore, in the current selection of the SS/PBCH block index, the SS/PBCH block index #6 and N−1 SS/PBCH block indexes starting from the SS/PBCH block index #2 are selected.

Note that step 2 may be an operation of selecting the SS/PBCH block index corresponding to each internal index $I_v$=mod $((i_n-1)*N+1, N^{SSB}_{TX})$, . . . $I_V$=mod $((i_n-1)*N+N, N^{SSB}_{TX})$. Here $i_n$ is an internal index that is incremented after performing the operation in step 2. $i_n$ has an initial value of 0.

Step 3 includes an operation of allocating N SS/PBCH block indexes selected in step 2 to one PRACH occasion. Subsequently, the PRACH occasion next to the one PRACH occasion is selected. Here, the PRACH occasions are ordered based on a frequency-first time-second rule.

Step 4 includes an operation of determining the end of the procedure. In a case that the one PRACH occasion in step 3 is the last PRACH occasion in the association period, the procedure is ended. In a case that the PRACH occasion next to the one PRACH occasion in step 3 is selected, then return to step 2 results.

For example, $N_{total}$ random access preambles on one PRACH occasion may be allocated to one SS/PBCH block index.

In FIG. 10, among 64 random access preambles included in the PRACH occasion 9001, $N_{total}/N$ random access preambles with indexes 0 to $N_{total}/N-1$ may be allocated to the SS/PBCH block #2. Among 64 random access preambles included in the PRACH occasion 9001, $N_{total}/N$ random access preambles with indexes $N_{total}/N$ to $2*N_{total}/N-1$ may be allocated to the SS/PBCH block #5.

In FIG. 10, among 64 random access preambles included in the PRACH occasion 9002, $N_{total}/N$ random access preambles with indexes 0 to $N_{total}/N-1$ may be allocated to the SS/PBCH block #6. Among 64 random access preambles included in the PRACH occasion 9002, $N_{total}/N$ random access preambles with indexes $N_{total}/N$ to $2*N_{total}/N-1$ may be allocated to the SS/PBCH block #2.

In FIG. 10, among 64 random access preambles included in the PRACH occasion 9003, $N_{total}/N$ random access preambles with indexes 0 to $N_{total}/N-1$ may be allocated to the SS/PBCH block #5. Among 64 random access preambles included in the PRACH occasion 9003, $N_{total}/N$ random access preambles with indexes $N_{total}/N$ to $2*N_{total}/N-1$ may be allocated to the SS/PBCH block #6.

In FIG. 10, among 64 random access preambles included in the PRACH occasion 9004, $N_{total}/N$ random access preambles with indexes 0 to $N_{total}/N-1$ may be allocated to the SS/PBCH block #2. Among 64 random access preambles included in the PRACH occasion 9004, $N_{total}/N$ random access preambles with indexes $N_{total}/N$ to $2*N_{total}/N-1$ may be allocated to the SS/PBCH block #5.

Thus, the allocation of random access preambles to SS/PBCH block indexes may be determined based on at least one or both of N and $N_{total}$.

Among $N_{total}/N$ random access preambles allocated to a certain SS/PBCH block index on one PRACH occasion, R random access preambles may be used for CBRA. The terminal apparatus 1 may determine the random access preamble for CBRA based on at least R.

For example, among $N_{total}/N$ random access preambles allocated to a certain SS/PBCH block index on one PRACH occasion, the terminal apparatus 1 may determine random access preambles with indexes $(n-1)*N_{total}/N$ to $(n-1)*N_{total}/N+R-1$ to be used for CBRA. Here, n corresponds to the SS/PBCH block index selected as the n-th of N SS/PBCH block indexes selected for one PRACH occasion. The value of n is given ranging from 1 to N.

In CBRA, the terminal apparatus 1 may select one from among the random access preambles for CBRA included in the random access preambles associated with a certain SS/PBCH block index. For example, the certain SS/PBCH block index may be indicated by a higher layer parameter. The certain SS/PBCH block index may be indicated by a DCI format. In a case that the certain SS/PBCH block index is not notified by a radio signal transmitted from the base station apparatus 3, one of the one or more SS/PBCH blocks detected by the terminal apparatus 1 may be selected based on at least reception intensity.

In the radio communication system according to an aspect of the present embodiment, in a case that the PUSCH transmitted by the terminal apparatus 1 located at a cell edge file generating section 103 fails to be appropriately received by the base station apparatus 3, an expansion function for the PUSCH may be added. For example, repeated transmission of the PUSCH performed by the terminal apparatus 1 enables an increase in transmit power per modulation symbol transmitted on the PUSCH, leading to expectation of improved performance.

In a case that the PUSCH is scheduled in the DCI format with the CRC sequence scrambled with the C-RNTI for the terminal apparatus 1 that is RRC connected, the base station apparatus 3 may notify the terminal apparatus 1 whether to add the expansion function to the PUSCH. The base station apparatus 3 may determine whether to add the expansion function to the PUSCH based on the CSI reported by the terminal apparatus 1, reception quality information based on radio section measurement, and the like. For example, the reception quality information may be a Reference Signal Received Power (RSRP).

On the other hand, the terminal apparatus 1 that is not RRC connected has not provided the report or fails to be identified by the base station apparatus 3, and thus for such a terminal apparatus, the base station apparatus 3 may have difficulty in determining whether to add the expansion function to the PUSCH to be scheduled based on the random access response grant.

In CBRA, the terminal apparatus 1 may determine the SS/PBCH block index of an SS/PBCH block, having the largest RSRP, of the received one or multiple SS/PBCH blocks. The terminal apparatus 1 may determine whether the largest RSRP satisfies a prescribed condition. For example, the prescribed condition may be based on a comparison between the highest RSRP and a prescribed threshold. The prescribed condition may be based on whether the highest RSRP is greater than a prescribed threshold. The prescribed condition may be based on whether the highest RSRP is smaller than a prescribed threshold.

The terminal apparatus 1 may select either a first set of random access preambles for CBRA or a second set of random access preambles for CBRA based on whether the prescribed condition is satisfied. The first set of random access preambles for CBRA may be a set selected in a case that the prescribed condition is not satisfied. The second set of random access preambles for CBRA may be a set selected in a case that the prescribed condition is satisfied. In a case that the determination based on the prescribed condition is not performed, the first set of random access preambles for CBRA may be selected.

The first set of random access preambles corresponds to a first random access procedure. In other words, in a case that the execution of the first random access procedure is notified from the higher layer of the terminal apparatus 1, one random access preamble may be selected from among the first set of random access preambles. The selected random access preamble may be transmitted on a selected PRACH occasion.

The first random access procedure may be a four-step random access.

The second set of random access preambles corresponds to a second random access procedure. That is, in a case that the execution of the second random access procedure is notified from the higher layer of the terminal apparatus 1, one random access preamble may be selected from among the second set of random access preambles. The selected random access preamble may be transmitted on a selected PRACH occasion.

The second random access procedure may be a four-step random access, and may be different from the first random access procedure. For example, the second random access procedure may be a scheme corresponding to the first random access procedure to which the expansion function is added.

The first set of random access preambles for CBRA may be determined based on first RACH configuration information included in the RRC message. The first RACH configuration information includes at least some or all of R1 to R7 described below.

R1) PRACH configuration index
R2) Number of PRACH occasions to be frequency multiplexed
R3) random access response window
R4) Sum of random access preambles
R5) Number of SS/PBCH blocks associated with one PRACH occasion
R6) number of preambles for CBRA,
R7) message 3 transmission scheme The PRACH configuration index is an index used at least for determining some or all of the index of the subframe to which the PRACH occasion is allocated and the temporal allocation of PRACHs within the slot (such as the first OFDM symbol index).

The PRACH occasion can be configured in the frequency domain for the number of PRACH occasions that are frequency multiplexed.

The random access response window indicates a period (window) in which the terminal apparatus 1 transmits a random access preamble and then performs monitoring of a random access response corresponding to the random access preamble.

$N_{total}$ denotes the sum of random access preambles.

N denotes the number of SS/PBCH blocks associated with one PRACH occasion.

R denotes the number of preambles for CBRA.

The message 3 transmission scheme indicates whether modified precoding is used in the transmission scheme used for the PUSCH for the message 3.

The second set of random access preambles for CBRA may be determined based on the second RACH configuration information included in the RRC message. The second RACH configuration information includes at least some or all of R1 to R7 described below.

For example, the same resources may be shared by the PRACH occasions configured for the first random access procedure and the PRACH occasions configured for the second random access procedure. Such a configuration is also referred to as a first-second shared configuration.

For example, different resources may be used for the PRACH occasions configured for the first random access procedure and for at least some of the PRACH occasions configured for the second random access procedure. Such a configuration is also referred to as a first and second individual configuration.

For example, in the first-second shared configuration, the second RACH configuration information may include at least the number R, of preambles for CBRA. Among $N_{total}/N$ random access preambles allocated to a certain SS/PBCH block index on one PRACH occasion, the terminal apparatus 1 determines random access preambles with indexes $(n-1)*N_{total}/N+R$ to $(n-1)*N_{total}/N+R+R_x-1$ to be the second set of random access preambles for CBRA.

For example, in the first and second individual configuration, among $N_{total}/N$ random access preambles allocated to a certain SS/PBCH block index on one PRACH occasion, the terminal apparatus 1 determines random access preambles with indexes $(n-1)*N_{total}/N$ to $(n-1)*N_{total}/N+R-1$ to be the second set of random access preambles for CBRA.

The terminal apparatus 1 may select one of the first set of random access preambles for CBRA, the second set of random access preambles for CBRA, or the set of third random access preambles for CBRA based on a condition 1.

The condition 1 may be given based on at least the two thresholds associated with the RSRP. For example, in a case that the largest RSRP is between a threshold A and a threshold B, the terminal apparatus 1 may select the first set of random access preambles for CBRA. In a case that the largest RSRP is smaller than the threshold B, the terminal apparatus 1 may select a second set of random access preambles for CBRA. In a case that the largest RSRP is larger than the threshold A, the terminal apparatus 1 may select the set of third random access preambles for CBRA.

The set of third random access preambles corresponds to a third random access procedure. In other words, in a case that the execution of the third random access procedure is notified from the higher layer of the terminal apparatus 1, one random access preamble may be selected from among the set of third random access preambles. The selected random access preamble may be transmitted on a selected PRACH occasion.

The third random access procedure may be a two-step random access. In the two-step random access, the terminal apparatus 1 transmits a message A to the base station apparatus 3. The message A includes a PRACH and a PUSCH. The base station apparatus 3 receives the message A and transmits a message B to the terminal apparatus 1. The message B includes a PDSCH.

The set of third random access preambles for CBRA may be determined based on third RACH configuration information included in the RRC message. The third RACH configuration information includes at least some or all of R1 to R7 described below.

For example, the same resources may be shared by the PRACH occasions configured for the first random access procedure and the PRACH occasions configured for the third random access procedure. Such a configuration is also referred to as a first-third shared configuration.

For example, different resources may be used for the PRACH occasions configured for the first random access procedure and for at least some of the PRACH occasions configured for the third random access procedure. Such a configuration is also referred to as a first and third individual configuration.

For example, in the first-third shared configuration, the third RACH configuration information may include at least the number $R_z$ of preambles for CBRA. Among $N_{total}/N$ random access preambles allocated to a certain SS/PBCH block index on one PRACH occasion, the terminal apparatus 1 may determine random access preambles with indexes $(n-1)*N_{total}/N+R$ to $(n-1)*N_{total}/N+R_z-1$ to be the set of third random access preambles for CBRA.

For example, the same resources may be shared by the PRACH occasions configured for the first random access procedure, the PRACH occasions configured for the second random access procedure, and the PRACH occasions configured for the third random access procedure. The terminal apparatus 1 cannot necessarily recognize the third random access procedure, and may thus change the method for determining the second set of random access preambles.

For example, in the first-second shared configuration, the second RACH configuration information may include at least the number R. of preambles for CBRA. Among $N_{total}/N$ random access preambles allocated to a certain SS/PBCH block index on one PRACH occasion, the terminal apparatus 1 may determine random access preambles with indexes $(n-1)*N_{total}/N+S_x$ to $(n-1)*N_{total}/N+S_x+R_x-1$ to be the second set of random access preambles for CBRA. Here, S, may be indicated by a parameter included in the second RACH configuration information.

For example, in the first-second shared configuration, the second RACH configuration information may include at least the number R. of preambles for CBRA. Among $N_{total}/N$ random access preambles allocated to a certain SS/PBCH block index on one PRACH occasion, the terminal apparatus 1 may determine random access preambles with indexes $n*S_y$ to $n*S_y+R_x-1$ to be the second set of random access preambles for CBRA. Here, $S_y$ may be indicated by a parameter included in the second RACH configuration information.

For example, in the first-second shared configuration, the second RACH configuration information includes at least the number $R_Y$ of preambles for CBRA. Among $N_{total}/N$ random access preambles allocated to a certain SS/PBCH block index on one PRACH occasion, the terminal apparatus 1 may determine random access preambles with indexes $(n-1)*R_Y+N_{total}$ to $n*R_Y+N_{total}-1$ to be the second set of random access preambles for CBRA.

For example, in the first and third individual configuration, among $N_{total}/N$ random access preambles allocated to a certain SS/PBCH block index on one PRACH occasion, the terminal apparatus 1 may determine random access preambles with indexes $(n-1)*N_{total}/N$ to $(n-1)*Na/N+R-1$ to be the set of third random access preambles for CBRA.

The terminal apparatus 1 may select one of the first set of random access preambles for CBRA, the second set of random access preambles for CBRA, the set of third random access preambles for CBRA, or a set of fourth random access preambles for CBRA, based on a condition 2.

The set of fourth random access preambles corresponds to a fourth random access procedure. In other words, in a case that the execution of the fourth random access procedure is notified from the higher layer of the terminal apparatus 1, one random access preamble may be selected from among the set of fourth random access preambles. The selected random access preamble may be transmitted on a selected PRACH occasion.

The fourth random access procedure may be a scheme corresponding to the third random access procedure to which the expansion function is added.

The condition 2 may be given based on at least two thresholds associated with the RSRP. For example, a threshold C may be used for switching between the four-step random access and the two-step random access. A threshold D may be used to determine whether to use the expansion function in the random access procedure. For example, in a case that the largest RSRP is greater than the threshold C, then the two-step random access may be selected. In a case that the largest RSRP is equal to the threshold C, either the two-step random access or the four-step random access may be selected. In a case that the largest RSRP is smaller than the threshold C, the four-step random access may be selected.

For example, in a case that the two-step random access is selected based on the threshold C, the third random access procedure may be selected in a case that the largest RSRP is greater than the threshold D. In a case that the largest RSRP is equal to the threshold D, the third random access procedure or the fourth random access procedure may be selected. In a case that the largest RSRP is smaller than the threshold D, the fourth random access procedure may be selected.

For example, in a case that the four-step random access is selected based on the threshold C, the first random access procedure may be selected in a case that the largest RSRP is larger than the threshold D. In a case that the largest RSRP is equal to the threshold D, the first random access procedure or the second random access procedure may be selected. In a case that the largest RSRP is smaller than the threshold D, the second random access procedure may be selected.

The condition 2 may be given based on at least three thresholds associated with the RSRP. For example, a threshold C may be used for switching between the four-step random access and the two-step random access. A threshold D1 may be used to determine whether to use the expansion function in the four-step random access procedure. A threshold D2 may be used to determine whether to use the expansion function in the two-step random access procedure. For example, in a case that the largest RSRP is greater than the threshold C, then the two-step random access may be selected. In a case that the largest RSRP is equal to the threshold C, either the two-step random access or the four-step random access may be selected. In a case that the largest RSRP is smaller than the threshold C, the four-step random access may be selected.

For example, in a case that the two-step random access is selected based on the threshold C, the third random access procedure may be selected in a case that the largest RSRP is greater than the threshold D2. In a case that the largest RSRP is equal to the threshold D2, the third random access procedure or the fourth random access procedure may be selected. In a case that the largest RSRP is smaller than the threshold D2, the fourth random access procedure may be selected.

For example, in a case that the four-step random access is selected based on the threshold C, the first random access procedure may be selected in a case that the largest RSRP is greater than the threshold D1. In a case that the largest RSRP is equal to the threshold D1, the first random access procedure or the second random access procedure may be selected. In a case that the largest RSRP is smaller than the threshold D1, the second random access procedure may be selected.

For example, in the first random access procedure, after transmission of the random access preamble, the DCI format used for scheduling of the PDSCH including the random access response may be monitored for a prescribed period of time. The prescribed period of time may be determined by a value indicated by a random access response window included in the first RACH configuration information. The CRC sequence added to the DCI format is scrambled with the RA-RNTI.

For example, in a case that the DCI format is detected within the prescribed period of time, an attempt may be made to decode the PDSCH that is scheduled using the DCI format. The PDSCH may include one or multiple random access responses. In a case of finding the terminal apparatus 1 finds a random access response including information matching the index of the random access preamble transmitted in the first random access procedure, the terminal apparatus 1 may transmit the PUSCH that is scheduled using the first random access response grant included in the random access response found.

Here, the first random access response grant may include at least a time domain resource assignment field. Here, the time domain resource assignment field indicates any of the columns included in a first Time Domain Resource Assignment (TDRA) table. The first TDRA table may include one or more columns. The information corresponding to one column may include at least some or all of K2, a Start and Length Indicator Value (SLIV), and a DMRS mapping type. Here, K2 may be used to indicate a slot in which the PUSCH is transmitted. In a case that n denotes the slot in which the PUSCH is transmitted, the random access response is transmitted in n-K2. The SLIV may be used to indicate the first OFDM symbol of the PUSCH in the slot and the length of the PUSCH. The DMRS mapping type may be used to indicate the type of allocation of the DMRS for the PUSCH.

The first TDRA table need not use the PUSCH repeat (PUSCH repetition).

For example, in the second random access procedure, after transmission of the random access preamble, the DCI format used for scheduling the PDSCH including the random access response may be monitored for a prescribed period of time. The prescribed period of time may be determined by a value indicated by the random access response window included in the second RACH configuration information. In a case that the second RACH configuration information includes no information indicating the random access response window, the prescribed period of time may be determined by a value indicated by the random access response window included in the first RACH configuration information. The CRC sequence added to the DCI format is scrambled with the RA-RNTI.

For example, in a case that the DCI format is detected within the prescribed period of time, an attempt may be made to decode the PDSCH that is scheduled using the DCI format. The PDSCH may include one or multiple random access responses. In a case of finding a random access response including information matching the index of the random access preamble transmitted in the first random access procedure, the terminal apparatus 1 may transmit the PUSCH that is scheduled using the second random access response grant included in the random access response found.

Here, the second random access response grant may include at least the time domain resource assignment field. Here, the time domain resource assignment field indicates any of the columns included in the second TDRA table. The second TDRA table may include one or more columns. The information corresponding to one column may include at least some or all of K2, a Start and Length Indicator Value (SLIV), and a DMRS mapping type. Here, K2 may be used to indicate a slot in which the PUSCH is transmitted. In a case that n denotes the slot in which the PUSCH is transmitted, the random access response is transmitted in n-K2. The SLIV may be used to indicate the first OFDM symbol of the PUSCH in the slot and the length of the PUSCH. The DMRS mapping type may be used to indicate the type of allocation of the DMRS for the PUSCH.

The second TDRA table may be different from the first TDRA table.

For example, the second TDRA table may include information used for determining the number of repetitions of the PUSCH. For example, the second TDRA table may include information indicating the number of repetitions of the PUSCH.

In a case that information indicating the number of repetitions of the PUSCH is included in the information corresponding to one column indicated by the time domain resource assignment field, K2 may be used to indicate the first slot of multiple slots in which the PUSCH is transmitted.

Figure 11:
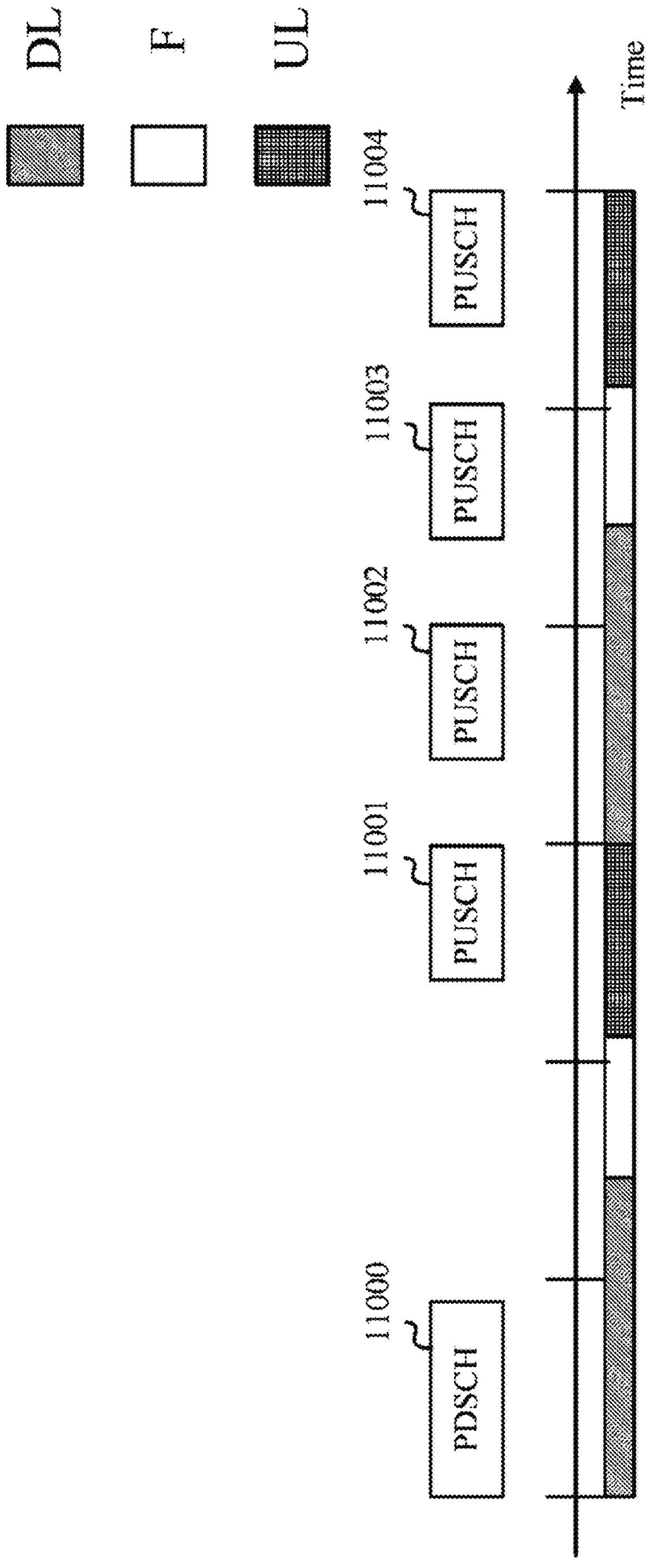
FIG. 11 is a diagram illustrating an example of a first PUSCH repetition type according to an aspect of the present embodiment.

FIG. 11 is a diagram illustrating an example related to a first PUSCH repetition type according to an aspect of the present embodiment. In FIG. 11, the horizontal axis indicates the time domain. Grid lines on the time domain indicate boundaries between slots. Parts of the time domain corresponding to hatched blocks indicate that the parts of the time domain are in the downlink. A part of the time domain being in the downlink indicates that OFDM symbols included in the part of the time domain are downlink symbols. Parts of the time domain corresponding to blank blocks indicates that the parts of the time domain are flexible regions. A part of the time domain being a flexible region indicates that OFDM symbols included in the part of the time domain are flexible symbols. Parts of the time domain corresponding to blocks hatched with grid lines indicates that the parts of the time domain are in the uplink. A part of the time domain being in the uplink indicates that OFDM symbols included in the part of the time domain are uplink symbols.

In FIG. 11, a PDSCH 11000 including the random access response is transmitted in a downlink region. The PUSCH that is scheduled using the random access response grant included in the random access response is allocated to the PUSCHs 11001 to 11004. Here, the random access response grant indicates that K2 is 2 and that the number of repetitions of the PUSCH is 4. As illustrated in FIG. 11, in the first PUSCH repetition type, the PUSCH may be repeatedly transmitted in multiple slots. Each of the resources of the repeatedly transmitted PUSCH may start from the same OFDM symbol in the slot. Each of the resources of the repeated PUSCH may be configured with the same number of OFDM symbols.

For a first PUSCH repetition type, whether the PUSCH is transmitted may be determined based on a Time Division Duplex (TDD) pattern. For example, in a certain slot, for the set of OFDM symbols constituting the resource of the PUSCH, the transmission need not be performed in the resource of the PUSCH based on some or all of the OFDM symbols being configured as downlink symbols in accordance with the TDD pattern. In a certain slot, for the set of OFDM symbols constituting the resource of the PUSCH, the transmission may be performed in the resource of the PUSCH based on none of the OFDM symbols being configured as downlink symbols in accordance with the TDD pattern.

The TDD pattern is a general term for a first TDD pattern configuration, a second TDD pattern configuration, and a third TDD pattern configuration.

The first TDD pattern configuration may be provided by the first TDD pattern configuration information included in the RRC message. The first TDD pattern configuration information may include some or all of T1 to T6.

T1) Reference subcarrier spacing $u_{ref}$

T2) Slot configuration period P

T3) Number $d_{slots}$ of downlink slots

T4) Uplink slots $u_{sym}$

T5) Number $d_{sym}$ of downlink symbols

T6) Number $u_{sym}$ of uplink symbols

The reference subcarrier spacing $u_{ref}$ indicates the subcarrier spacing used in determining the configuration of slots T2 to T6.

The pattern determined by some or all of T3 to T6 has a period determined based on the slot configuration period P. The number S of slots included in one periodicity of the pattern is given by $S=P*2^{\wedge}u_{ref}$. In the first TDD pattern configuration, the pattern may be repeated based on the periodicity of the pattern.

The number $d_{slot}$ of downlink slots indicates that the OFDM symbols included in the first $d_{slot}$ of the S slots are downlink symbols.

The number $u_{slot}$ of uplink slots indicates that the OFDM symbols included in the last $u_{slot}$ of the S slots are uplink symbols.

The number $d_{sym}$ of downlink symbols indicates that $d_{sym}$ OFDM symbols corresponding to the first to $d_{slot}$-th of the S slots are downlink symbols.

The number $u_{sym}$ of uplink symbols indicates that $u_{sym}$ OFDM symbols corresponding to the last of the S slots to the $d_{slot}$-th from the last slot are uplink symbols.

In other words, in the S slots, $d_{slot}*N^{slot}{}_{symb}+d_{sym}$ OFDM symbols starting from the first OFDM symbol may be downlink symbols. In the S slots, $u_{slot}*N^{slot}{}_{sym}+u_{sym}$ OFDM symbols starting from the last OFDM symbol may be uplink symbols. $S*N^{slot}{}_{symb}-(d_{slot}*N^{slot}{}_{symb}+d_{sym}+u_{slot}*N^{slot}{}_{symb}+u_{sym})$ OFDM symbols that are not downlink or uplink symbols are flexible symbols.

With no first TDD pattern configuration information provided, the first TDD pattern configuration may include only flexible regions.

The first TDD pattern configuration information may include information for configuring a pattern 2. The information for configuring the pattern 2 includes at least some or all of T3 to T6. In a case that the pattern 2 is configured, the configuration may be periodic repetition of a pattern corresponding to a combination of the pattern and the pattern 2.

The second pattern configuration may be provided by the second pattern configuration information included in the RRC message. The second pattern configuration information includes one or multiple pieces of slot individual configuration information. Each piece of slot individual configuration information may include information indicating a slot index and slot configuration information.

The information indicating the slot index included in the slot individual configuration information may identify a slot to which a configuration is applied, the configuration being based on the slot configuration information included in the slot individual configuration information. The information indicating the slot index may indicate a slot index in the S slot.

The slot configuration information may indicate any of the first configuration, the second configuration, and the third configuration. The first configuration may be a configuration indicating that the OFDM symbols included in the slot identified by the information indicating the slot index are downlink symbols. The second configuration may be a configuration indicating that the OFDM symbols included in the slot identified by the information indicating the slot index are uplink symbols. The third configuration may indicate the number $d_{sym2}$ of downlink symbols in the slot and the number $u_{sym2}$ of uplink symbols in the slot. In the third configuration, the first $d_{sym2}$ OFDM symbols in the slot identified by the information indicating the slot index may be downlink symbols. In the third configuration, $u_{sym2}$ OFDM symbols from the last symbol in the slot identified by the information indicating the slot index may be uplink symbols. In the third configuration, in the slot identified by the information indicating the slot index, OFDM symbols that are neither downlink symbols nor uplink symbols may be flexible symbols.

The OFDM symbols configured as downlink symbols in the first TDD pattern configuration need not be configured as uplink symbols in the second TDD pattern configuration. The OFDM symbols configured as uplink symbols in the first TDD pattern configuration need not be configured as downlink symbols in the second TDD pattern configuration.

For example, in a case that the first TDD pattern configuration and the second TDD pattern configuration are provided for the terminal apparatus 1, then for the PUSCH that is scheduled using the first random access response grant, the second TDD pattern configuration may be referenced to determine whether transmission is performed in the resource of the PUSCH in each slot. Here, for example, in a case that in accordance with the second TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the second TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, then for the PUSCH that is scheduled using the second random access response grant, the first TDD pattern configuration may be referenced to determine whether transmission is performed in the resource of the PUSCH in each slot. Here, for example, in a case that in accordance with the first TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the first TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, and the first PUSCH repetition type is applied to the PUSCH that is scheduled using the second random access response grant, then the first TDD pattern configuration may be referenced to determine whether transmission is performed in the resource of the PUSCH in each slot. For example, in a case that in accordance with the first TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the first TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, and the first PUSCH repetition type is not applied to the PUSCH that is scheduled using the second random access response grant, then the second TDD pattern configuration may be referenced to determine whether transmission is performed in the resource of the PUSCH in each slot. For example, in a case that in accordance with the second TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the second TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, the first PUSCH repetition type is applied to the PUSCH that is scheduled using the second random access response grant, and the C-RNTI is reported to the base station apparatus 3 using the PUSCH, then the first TDD pattern configuration may be referenced to determine whether transmission is performed in the resource of the PUSCH in each slot. For example, in a case that in accordance with the first TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the first TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, the first PUSCH repetition type is applied to the PUSCH that is scheduled using the second random access response grant, and the C-RNTI is not reported to the base station apparatus 3 using the PUSCH, then the second TDD pattern configuration may be referenced to determine whether transmission is performed in the resource of the PUSCH in each slot. For example, in a case that in accordance with the second TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the second TDD pattern configuration, for the set of OFDM symbols constituting the resource of the PUSCH in a certain slot, no OFDM symbols are configured as downlink symbols, then transmission may be performed in the resource.

Figure 12:
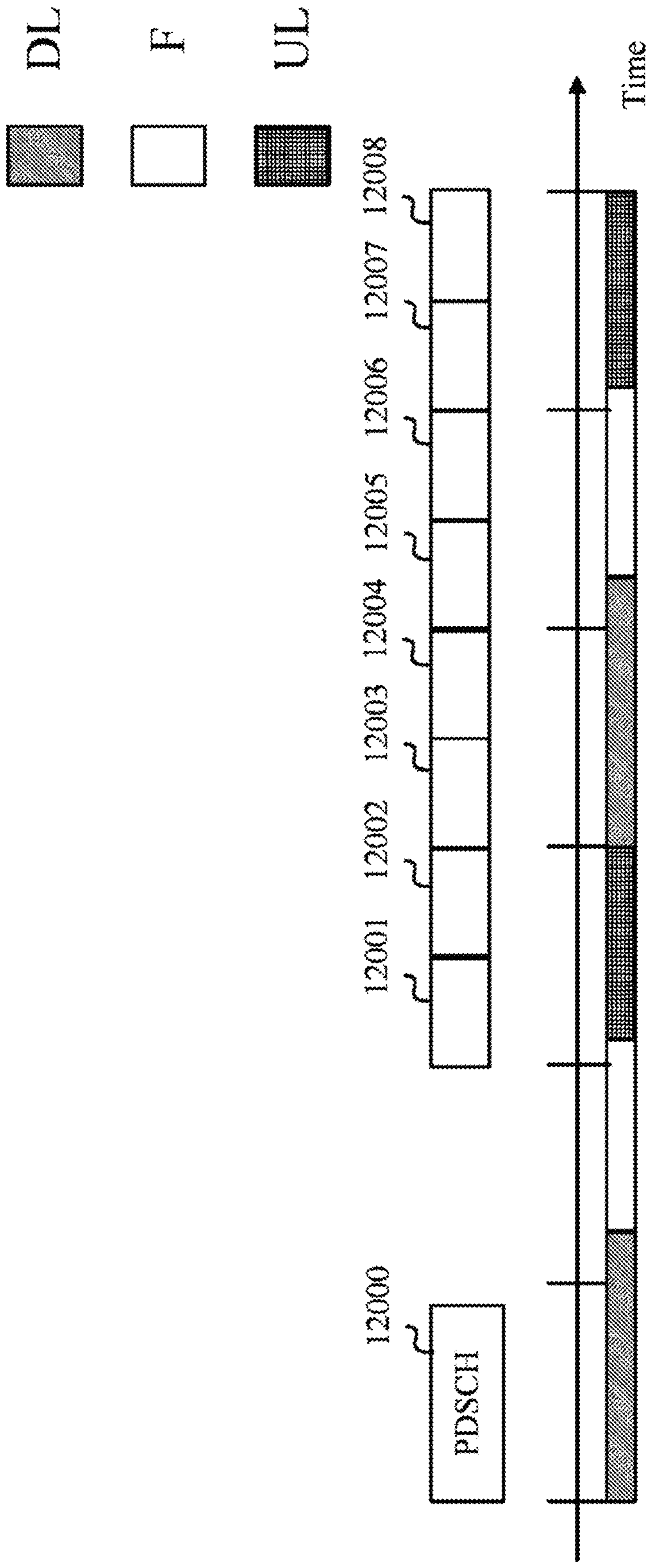
FIG. 12 is a diagram illustrating an example of a second PUSCH repetition type according to an aspect of the present embodiment.

FIG. 12 is a diagram illustrating an example related to a second PUSCH repetition type according to an aspect of the present embodiment. In FIG. 12, the horizontal axis indicates the time domain. Grid lines on the time domain indicate boundaries between slots. Parts of the time domain corresponding to hatched blocks indicate that the parts of the time domain are in the downlink. Parts of the time domain corresponding to blank blocks indicates that the parts of the time domain are flexible regions. Parts of the time domain corresponding to blocks hatched with grid lines indicates that the parts of the time domain are in the uplink.

In FIG. 12, a PDSCH 12000 including the random access response is transmitted in the downlink region. The PUSCH that is scheduled using the random access response grant included in the random access response is allocated to the PUSCHs 12001 to 12008. Here, the random access response grant indicates that K2 is 2, and the number of repetitions of the PUSCH is 8. As illustrated in FIG. 12, in the second PUSCH repetition type, resources of the PUSCH may be continuously allocated. Each of the resources of the PUSCH illustrated in FIG. 12 is also referred to as a nominal repetition.

The PUSCH of the nominal repetition as illustrated in FIG. 12 may configure actual repetition resources based on the TDD pattern configuration. The terminal apparatus 1 may transmit the PUSCH by using the actual repetition resources configured based on the TDD pattern configuration.

Figure 13:
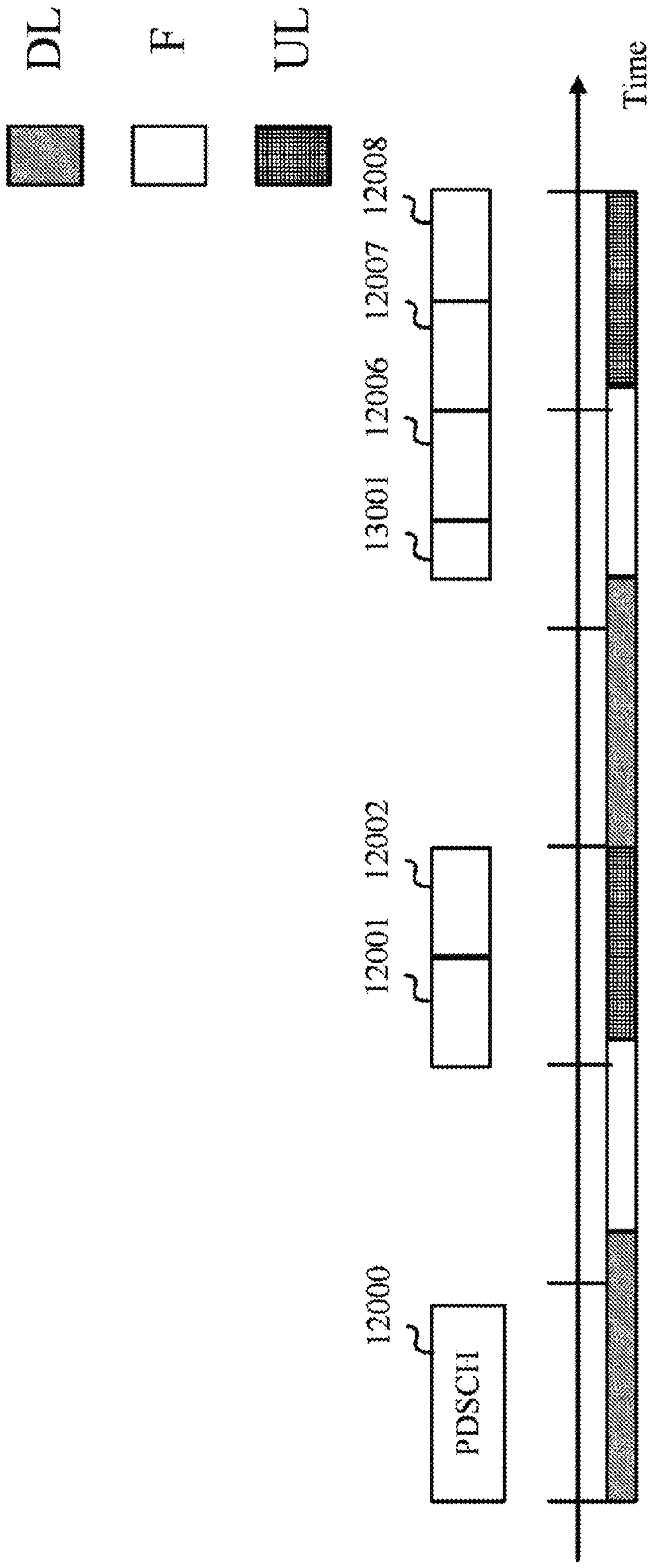
FIG. 13 is a diagram illustrating a configuration example of resources for actual repetition according to an aspect of the present embodiment.

FIG. 13 is a diagram illustrating a configuration example of actual repetition resources according to an aspect of the present embodiment. A set of OFDM symbols constituting a PUSCH 12001 in FIG. 12 includes no downlink symbols, and thus nominal repetition resources of the PUSCH 12001 are configured as actual repetition resources. A PUSCH 12002, a PUSCH 12006, a PUSCH 12007, and a PUSCH 12008 are similar to the PUSCH 12001. In other words, based on the inclusion of no downlink symbols in the set of OFDM symbols constituting the nominal repetition resources, the resources may be configured as actual repetition resources.

In FIG. 13, the set of OFDM symbols constituting the PUSCH 12003 includes only downlink symbols, the resources with nominal repetition of the PUSCH 12003 need not be configured as actual repetition resources. The PUSCH 12004 is similar to the PUSCH 12003. In other words, based on the inclusion of only downlink symbols in the set of OFDM symbols constituting the nominal repetition resources, the resources need not be configured as actual repetition resources.

In FIG. 13, the set of OFDM symbols constituting the PUSCH 12005 includes downlink symbols and flexible symbols, and thus among the resources of the PUSCH 12005, resources in the flexible region are configured as actual repetition resources. That is, based on the inclusion, in the set of OFDM symbols constituting the nominal repetition resources, of downlink symbols and symbols other than the downlink symbols, the resources other than the OFDM symbols of the downlink symbols may be configured as actual repetition.

The symbols other than downlink symbols correspond to a general term for flexible symbols and uplink symbols.

For example, in a case that the first TDD pattern configuration and the second TDD pattern configuration are provided for the terminal apparatus 1, then for the PUSCH that is scheduled using the first random access response grant, the second TDD pattern configuration may be referenced to determine actual repetition resources. Here, for example, in a case that in accordance with the second TDD pattern configuration, all of the symbols in the set of OFDM symbols constituting a certain nominal repetition are configured at least as downlink symbols, the resources need not be configured as actual repetition resources. In a case that in accordance with the second TDD pattern configuration, the set of OFDM symbols constituting a certain nominal repetition includes downlink symbols and symbols other than the downlink symbols, then the resources including the symbols other than the downlink symbols may be configured as actual repetition resources.

For example, in a case that the first TDD pattern configuration and the second TDD pattern configuration are provided for the terminal apparatus 1, then for the PUSCH that is scheduled using the second random access response grant, the first TDD pattern configuration may be referenced to determine actual repetition resources. Here, for example, in a case that in accordance with the first TDD pattern configuration, all of the symbols in the set of OFDM symbols constituting a certain nominal repetition are configured at least as downlink symbols, the resources need not be configured as actual repetition resources. In a case that in accordance with the first TDD pattern configuration, the set of OFDM symbols constituting the certain nominal repetition includes downlink symbols and symbols other than the downlink symbols, the resources including the symbols other than the downlink symbols may be configured as actual repetition resources.

For example, in a case that the first TDD pattern configuration and the second TDD pattern configuration are provided for the terminal apparatus 1, and the second PUSCH repetition type is applied to the PUSCH that is scheduled using the second random access response grant, for to the PUSCH that is scheduled using the second random access response grant, the first TDD pattern configuration may be referenced to determine actual repetition resources. Here, for example, in a case that in accordance with the first TDD pattern configuration, all of the symbols in the set of OFDM symbols constituting a certain nominal repetition are configured at least as downlink symbols, the resources need not be configured as actual repetition resources. In a case that in accordance with the first TDD pattern configuration, the set of OFDM symbols constituting the certain nominal repetition includes downlink symbols and symbols other than the downlink symbols, the resources including the symbols other than the downlink symbols may be configured as actual repetition resources.

For example, in a case that the first TDD pattern configuration and the second TDD pattern configuration are provided for the terminal apparatus 1, and the second PUSCH repetition type is not applied to the PUSCH that is scheduled using the second random access response grant, then for the PUSCH that is scheduled using the second random access response grant, the second TDD pattern configuration may be referenced to determine actual repetition resources. Here, for example, in a case that in accordance with the second TDD pattern configuration, all of the symbols in the set of OFDM symbols constituting a certain nominal repetition are configured at least as downlink symbols, the resources need not be configured as actual repetition resources. In a case that in accordance with the second TDD pattern configuration, the set of OFDM symbols constituting the certain nominal repetition includes downlink symbols and symbols other than the downlink symbols, then the resources including the symbols other than the downlink symbols may be configured as actual repetition resources.

For example, in a case that the first TDD pattern configuration and the second TDD pattern configuration are provided for the terminal apparatus 1, the second PUSCH repetition type is applied to the PUSCH that is scheduled using the second random access response grant, and the C-RNTI is reported to the base station apparatus 3 using the PUSCH, then for the PUSCH that is scheduled using the second random access response grant, the first TDD pattern configuration may be referenced to determine actual repetition resources. Here, for example, in a case that in accordance with the first TDD pattern configuration, all of the symbols in the set of OFDM symbols constituting a certain nominal repetition are configured at least as downlink symbols, the resources need not be configured as actual repetition resources. In a case that in accordance with the first TDD pattern configuration, the set of OFDM symbols constituting the certain nominal repetition includes downlink symbols and symbols other than the downlink symbols, the resources including the symbols other than the downlink symbols may be configured as actual repetition resources.

For example, in a case that the first TDD pattern configuration and the second TDD pattern configuration are provided for the terminal apparatus 1, the second PUSCH repetition type is applied to the PUSCH that is scheduled using the second random access response grant, and the C-RNTI is not reported to the base station apparatus 3 using the PUSCH, then for the PUSCH that is scheduled using the second random access response grant, the second TDD pattern configuration may be referenced to determine actual repetition resources. Here, for example, in a case that in accordance with the second TDD pattern configuration, all of the symbols in the set of OFDM symbols constituting a certain nominal repetition are configured at least as downlink symbols, the resources need not be configured as actual repetition resources. In a case that in accordance with the second TDD pattern configuration, the set of OFDM symbols constituting the certain nominal repetition includes downlink symbols and symbols other than the downlink symbols, then the resources including the symbols other than the downlink symbols may be configured as actual repetition resources.

For example, in a case that the first TDD pattern configuration and the second TDD pattern configuration are provided for the terminal apparatus 1, then for the PUSCH that is transmitted with the PRACH in a message A in the third random access procedure, the second TDD pattern configuration may be referenced to determine whether transmission is performed in the resource of the PUSCH in each slot. Here, for example, in a case that in accordance with the second TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the second TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, then for the PUSCH that is transmitted with the PRACH in the message A in the fourth random access procedure, the first TDD pattern configuration may be referenced to determine whether transmission is performed in the resource of the PUSCH in each slot. Here, for example, in a case that in accordance with the first TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the first TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, and the first PUSCH repetition type is applied to the PUSCH that is transmitted with the PRACH in the message A in the fourth random access procedure, then the first TDD pattern configuration may be referenced to determine whether transmission is performed in the resource of the PUSCH in each slot. For example, in a case that in accordance with the first TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the first TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, and the first PUSCH repetition type is not applied to the PUSCH that is transmitted with the PRACH in the message A in the fourth random access procedure, then the second TDD pattern configuration may be referenced to determine whether transmission is performed in the resource of the PUSCH in each slot. For example, in a case that in accordance with the second TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the second TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, and the first PUSCH repetition type is applied to the PUSCH that is transmitted with the PRACH in the message A in the fourth random access procedure, and the C-RNTI is reported to the base station apparatus 3 using the PUSCH, then the first TDD pattern configuration may be referenced to determine whether transmission is performed in the resource of the PUSCH in each slot. For example, in a case that in accordance with the first TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the first TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, and the first PUSCH repetition type is applied to the PUSCH that is transmitted with the PRACH in the message A in the fourth random access procedure, and the C-RNTI is not reported to the base station apparatus 3 using the PUSCH, then the second TDD pattern configuration may be referenced to determine whether transmission is performed in the resource of the PUSCH in each slot. For example, in a case that in accordance with the second TDD pattern configuration, for the set of OFDM symbols constituting the resource of the PUSCH in a certain slot, some or all of the OFDM symbols are configured at least as downlink symbols, then transmission need not be performed in the resource. In a case that in accordance with the second TDD pattern configuration, for the set of OFDM symbols constituting the resource of the PUSCH in a certain slot, no OFDM symbols are configured as downlink symbols, then transmission may be performed in the resource.

For example, in a case that the first TDD pattern configuration and the second TDD pattern configuration are provided for the terminal apparatus 1, then for the PUSCH that is transmitted with the PRACH in the message A in the third random access procedure, the second TDD pattern configuration may be referenced to determine actual repetition resources. Here, for example, in a case that in accordance with the second TDD pattern configuration, all of the symbols in the set of OFDM symbols constituting a certain nominal repetition are configured at least as downlink symbols, the resources need not be configured as actual repetition resources. In a case that in accordance with the second TDD pattern configuration, the set of OFDM symbols constituting the certain nominal repetition includes downlink symbols and symbols other than the downlink symbols, then the resources including the symbols other than the downlink symbols may be configured as actual repetition resources.

For example, in a case that the first TDD pattern configuration and the second TDD pattern configuration are provided for the terminal apparatus 1, then for the PUSCH that is transmitted with the PRACH in the message A in the fourth random access procedure, the first TDD pattern configuration may be referenced to determine actual repetition resources. Here, for example, in a case that in accordance with the first TDD pattern configuration, all of the symbols in the set of OFDM symbols constituting a certain nominal repetition are configured at least as downlink symbols, the resources need not be configured as actual repetition resources. In a case that in accordance with the first TDD pattern configuration, the set of OFDM symbols constituting the certain nominal repetition includes downlink symbols and symbols other than the downlink symbols, the resources including the symbols other than the downlink symbols may be configured as actual repetition resources.

For example, in a case that the first TDD pattern configuration and the second TDD pattern configuration are provided for the terminal apparatus 1, and the second PUSCH repetition type is applied to the PUSCH that is transmitted with the PRACH in the message A in the fourth random access procedure, the first TDD pattern configuration may be referenced to determine actual repetition resources for the PUSCH. Here, for example, in a case that in accordance with the first TDD pattern configuration, all of the symbols in the set of OFDM symbols constituting a certain nominal repetition are configured at least as downlink symbols, the resources need not be configured as actual repetition resources. In a case that in accordance with the first TDD pattern configuration, the set of OFDM symbols constituting the certain nominal repetition includes downlink symbols and symbols other than the downlink symbols, the resources including the symbols other than the downlink symbols may be configured as actual repetition resources.

For example, in a case that the first TDD pattern configuration and the second TDD pattern configuration are provided for the terminal apparatus 1, and the second PUSCH repetition type is not applied to the PUSCH that is transmitted with the PRACH in the message A in the fourth random access procedure, the second TDD pattern configuration may be referenced to determine actual repetition resources for the PUSCH. Here, for example, in a case that in accordance with the second TDD pattern configuration, all of the symbols in the set of OFDM symbols constituting a certain nominal repetition are configured at least as downlink symbols, the resources need not be configured as actual repetition resources. In a case that in accordance with the second TDD pattern configuration, the set of OFDM symbols constituting the certain nominal repetition includes downlink symbols and symbols other than the downlink symbols, then the resources including the symbols other than the downlink symbols may be configured as actual repetition resources.

For example, in a case that the first TDD pattern configuration and the second TDD pattern configuration are provided for the terminal apparatus 1, and the second PUSCH repetition type is applied to the PUSCH that is transmitted with the PRACH in the message A in the fourth random access procedure, and the C-RNTI is reported to the base station apparatus 3 using the PUSCH, then the first TDD pattern configuration may be referenced to determine actual repetition resources for the PUSCH. Here, for example, in a case that in accordance with the first TDD pattern configuration, all of the symbols in the set of OFDM symbols constituting a certain nominal repetition are configured at least as downlink symbols, the resources need not be configured as actual repetition resources. In a case that in accordance with the first TDD pattern configuration, the set of OFDM symbols constituting the certain nominal repetition includes downlink symbols and symbols other than the downlink symbols, the resources including the symbols other than the downlink symbols may be configured as actual repetition resources.

For example, in a case that the first TDD pattern configuration and the second TDD pattern configuration are provided for the terminal apparatus 1, and the second PUSCH repetition type is applied to the PUSCH that is transmitted with the PRACH in the message A in the fourth random access procedure, and the C-RNTI is not reported to the base station apparatus 3 using the PUSCH, then the second TDD pattern configuration may be referenced to determine actual repetition resources for the PUSCH. Here, for example, in a case that in accordance with the second TDD pattern configuration, all of the symbols in the set of OFDM symbols constituting a certain nominal repetition are configured at least as downlink symbols, the resources need not be configured as actual repetition resources. In a case that in accordance with the second TDD pattern configuration, the set of OFDM symbols constituting the certain nominal repetition includes downlink symbols and symbols other than the downlink symbols, then the resources including the symbols other than the downlink symbols may be configured as actual repetition resources.

Various aspects of apparatuses according to an aspect of the present embodiment will be described below.

(1) In order to accomplish the object described above, an aspect of the present invention is contrived to provide the following means. In other words, a first aspect of the present invention provides a terminal apparatus including a receiver configured to receive first TDD pattern configuration information and second TDD pattern configuration information, and a random access response grant, and a transmitter configured to transmit a PUSCH scheduled using the random access response grant, wherein in a case that a time domain resource assignment field included in the random access response grant indicates one of columns in a first table, whether to transmit the PUSCH is determined based on first TDD pattern information, and in a case that the time domain resource assignment field included in the random access response grant indicates one of columns in a second table, whether to transmit the PUSCH is determined based on second TDD pattern information.

(2) A second aspect of the present invention provides a base station apparatus including a transmitter configured to transmit first TDD pattern configuration information and second TDD pattern configuration information, and a random access response grant, and a receiver configured to receive a PUSCH scheduled using the random access response grant, wherein in a case that a time domain resource assignment field included in the random access response grant indicates one of columns in a first table, whether to transmit the PUSCH is determined based on first TDD pattern information, and in a case that the time domain resource assignment field included in the random access response grant indicates one of columns in a second table, whether to transmit the PUSCH is determined based on second TDD pattern information.

(3) A third aspect of the present invention is a terminal apparatus including a receiver configured to receive first RACH configuration information used in a first random access procedure and second RACH configuration information used in a second random access procedure, and a transmitter configured to select one random access preamble and to transmit the random access preamble on a PRACH, wherein the first RACH configuration information includes at least information indicative of a first number $N_{total}$ of random access preambles allocated on one PRACH occasion, information indicative of a first number N of SS/PBCH blocks allocated on the one PRACH occasion, and information indicative of a first number R of contention-based random access preambles allocated per SS/PBCH block on the one PRACH occasion, an index of the contention-based random access preamble used in the first random access procedure for an n-th SS/PBCH block on a certain PRACH occasion is selected from among indexes $(n-1)*N_{total}/N$ to $(n-1)*N_{total}/N+R-1$, and the second RACH configuration information includes at least a second number $R_x$ of contention-based random access preambles allocated per SS/PBCH block on the one PRACH occasion, and information indicative of a first value $S_x$, and an index of the contention-based random access preamble used in the second random access procedure for the n-th SS/PBCH block on the certain PRACH occasion is selected from among indexes $(n-1)*N_{total}/N+S_x$ to $(n-1)*N_{total}/N+S_x+R_x-1$.

(4) A fourth aspect of the present invention is a base station apparatus including a transmitter configured to transmit first RACH configuration information used in a first random access procedure and second RACH configuration information used in a second random access procedure, and a receiver configured to receive one random access preamble on a PRACH, wherein the first RACH configuration information includes at least information indicative of a first number $N_{total}$ of random access preambles allocated on one PRACH occasion, information indicative of a first number N of SS/PBCH blocks allocated on the one PRACH occasion, and information indicative of a first number R of contention-based random access preambles allocated per SS/PBCH block on the one PRACH occasion, an index of the contention-based random access preamble used in the first random access procedure for an n-th SS/PBCH block on a certain PRACH occasion is selected from among indexes $(n-1)*N_{total}/N$ to $(n-1)*N_{total}/N+R-1$, and the second RACH configuration information includes at least a second number $R_x$ of contention-based random access preambles allocated per SS/PBCH block on the one PRACH occasion, and information indicative of a first value $S_x$, and an index of the contention-based random access preamble used in the second random access procedure for the n-th SS/PBCH block on the certain PRACH occasion is selected from among indexes $(n-1)*N_{total}/N+S_x$ to $(n-1)*N_{total}/N+S_x+R_x-1$.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral device. A "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a fixed period of time, such as a volatile memory included in the computer system functioning as a server or a client in such a case. The above-described program may be one for realizing some of the above-described functions, and also may be one capable of realizing the above-described functions in combination with a program already recorded in a computer system.

Furthermore, the base station apparatus 3 according to the aforementioned embodiment may be achieved as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a NextGen RAN (NG-RAN or NR RAN). Moreover, the base station apparatus 3 according to the aforementioned embodiment may have some or all of the functions of a higher node for an eNodeB and/or a gNB.

Also, some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. Furthermore, a circuit integration technique is not limited to the LSI, and may be realized with a dedicated circuit or a general-purpose processor. Moreover, in a case that with advances in semiconductor technology, a circuit integration technology with which an LSI is replaced appears, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. For an aspect of the present invention, various modifications are possible within the scope of the claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

1 (1A, 1B, 1C) Terminal apparatus
3 Base station apparatus
10, 30 Radio transmission and/or reception unit
10*a*, 30*a* Radio transmitting unit
10*aa* Channel encoding/scrambling/modulation unit
10*ab* Layer mapping unit
10*ac* Precoding unit
10*ad* Time signal generation unit
10*ae* Space filter unit
10*af* Antenna unit
10*b*, 30*b* Radio receiving unit
10*ba* Channel decoding/descrambling/demodulation unit
10*bb* Layer de-mapping unit
10*bc* Channel demodulation unit
10*bd* Frequency signal generation unit
10*be* Space filter unit
10*bf* Antenna unit
11, 31 Antenna unit
12, 32 RF unit
13, 33 Baseband unit
14, 34 Higher layer processing unit
15, 35 Medium access control layer processing unit
16, 36 Radio resource control layer processing unit
91, 92, 93, 94 Search space set
300 Component carrier
301 Primary cell
302, 303 Secondary cell
1600 Spatial filter set
1700 Code book set
3000 Point
3001, 3002 Resource grid
3003, 3004 BWP
3011, 3012, 3013, 3014 Offset
3100, 3200 Common resource block set
9000 Association period
9001, 9002, 9003, 9004 PRACH occasion
9005 Index pool
11000, 12000 PDSCH
11001, 11002, 11003, 11004 PUSCH
12001, 12002, 12003, 12004, 12005, 12006, 12007, 12008 Nominal repetition
13001 Actual repetition resource

The invention claimed is:

1. A terminal apparatus comprising: a receiver configured to receive random access channel (RACH) configuration information used to determine a set of random access preambles for contention based random access (CBRA); and a transmitter configured to select a random access preamble from the set of random access preambles, and transmit the selected random access preamble on a physical random access channel (PRACH) occasion, wherein: the transmitter is configured to select, on the PRACH occasion, the random access preamble of the set of random access preambles for an n-th synchronization signal/physical broad cast channel (SS/PBCH) block from an index (n−1) $*N_{total}/N+S_x$ to an index (n-1) $*N_{total}/N+S_x+R_x-1$, the $N_{total}$ is a number of random access preambles, the N is a number of SS/PBCH blocks mapped to an SS/PBCH block, the $R_x$ is a number used to determine the set of random access preambles, and the $N_{total}$, the N, and the $R_x$ are included in the RACH configuration information, and the RACH configuration information further includes the $S_x$ being a number used to determine the set of random access preambles.

2. A base station comprising: a transmitter configured to transmit random access channel (RACH) configuration information used to determine a set of random access preambles for contention based random access (CBRA); and a receiver configured to receive, random access preamble on a physical random access channel (PRACH) occasion, the random access preamble being selected from the set of random access preambles, wherein: the receiver is configured to receive, on the PRACH occasion, the random access preamble of the set of random access preambles for an n-th synchronization signal/physical broadcast channel (SS/PBCH) block from an index $(n-1)*N_{total}/N+S_x$ to an index $(n-1)*N_{total}/N+S_x+R_x-1$ is selected, the $N_{total}$ is a number of random access preambles, the N is a number of SS/PBCH blocks mapped to an SS/PBCH block, the $R_x$ is a number used to determine the set of random access preambles, and the $N_{total}$, the N, and the $R_x$ are included in the RACH configuration information, and the RACH configuration information further includes the $S_x$ being a number used to determine the set of random access preambles.

3. A communication method performed by a terminal apparatus, the communication method comprising: receiving random access channel (RACH) configuration information used to determine a set of random access preambles for contention based random access (CBRA); selecting a random access preamble from the set of random access preambles; and transmitting the selected random access preamble on a physical random access channel (PRACH) occasion; the PRACH occasion, the random access preamble of the set of random access preambles for an n-th synchronization signal/physical broadcast channel (SS/PBCH) block from an index $(n-1)*N_{total}/N+S_x$ to an index $(n-1)*N_{total}/N+S_x+R_x-1$ is selected, the $N_{total}$ is a number of random access preambles, the N is a number of SS/PBCH blocks mapped to an SS/PBCH block, the $R_x$ is a number used to determine the set of random access preambles, and the $N_{total}$, the N, and the $R_x$ are included in the RACH configuration information, and the RACH configuration information further includes the $S_x$ being a number used to determine the set of random access preambles.

4. The terminal apparatus according to claim 1, wherein the transmitter further is configured to: recognize a plurality of sets of random access preambles, the plurality of sets of random access preambles including the set of random access preambles, and select the set of random access preambles from the plurality of sets of random access preambles based on a comparison of a value of reference signal received power (RSRP) with a value of a predetermined threshold, the value of RSRP being calculated for one SS/PBCH block.

* * * * *